(12) United States Patent
Burrough et al.

(10) Patent No.: US 9,235,267 B2
(45) Date of Patent: Jan. 12, 2016

(54) MULTI TOUCH WITH MULTI HAPTICS

(71) Applicant: Apple Inc., Cupertino, CA (US)

(72) Inventors: Bobby G. Burrough, San Jose, CA (US); Benjamin J. Pope, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 14/168,917

(22) Filed: Jan. 30, 2014

(65) Prior Publication Data

US 2014/0145994 A1     May 29, 2014

Related U.S. Application Data

(63) Continuation of application No. 12/419,174, filed on Apr. 6, 2009, now Pat. No. 8,686,952.

(60) Provisional application No. 61/140,519, filed on Dec. 23, 2008.

(51) Int. Cl.
*G06F 3/01* (2006.01)
*G06F 3/0488* (2013.01)
*G06F 3/041* (2006.01)

(52) U.S. Cl.
CPC .............. *G06F 3/016* (2013.01); *G06F 3/041* (2013.01); *G06F 3/04883* (2013.01); *G06F 2203/014* (2013.01); *G06F 2203/04808* (2013.01)

(58) Field of Classification Search
None
See application file for complete search history.

(56) References Cited

U.S. PATENT DOCUMENTS

| | | |
|---|---|---|
| 6,337,678 B1 | 1/2002 | Fish |
| 6,819,312 B2 | 11/2004 | Fish |
| 7,148,789 B2 | 12/2006 | Sadler et al. |
| 7,336,260 B2 | 2/2008 | Martin et al. |
| 7,369,115 B2 | 5/2008 | Cruz-Hernandez et al. |
| 2003/0122779 A1 | 7/2003 | Martin et al. |
| 2003/0179190 A1 | 9/2003 | Franzen |
| 2005/0017947 A1 | 1/2005 | Shahoian et al. |
| 2006/0109256 A1 | 5/2006 | Grant et al. |
| 2006/0119586 A1 | 6/2006 | Grant et al. |
| 2007/0146317 A1 | 6/2007 | Schena |
| 2007/0229455 A1 | 10/2007 | Martin et al. |
| 2007/0229478 A1 | 10/2007 | Rosenberg et al. |
| 2007/0236474 A1 | 10/2007 | Ramstein |
| 2007/0268274 A1 | 11/2007 | Westerman et al. |
| 2008/0024459 A1 | 1/2008 | Poupyrev et al. |
| 2008/0062122 A1 | 3/2008 | Rosenberg et al. |
| 2008/0062143 A1 | 3/2008 | Shahoian et al. |
| 2008/0062144 A1 | 3/2008 | Shahoian et al. |

(Continued)

OTHER PUBLICATIONS

How Haptics Will Change the Way We Interact With Machines, http://www.popularmechanics.com/technology/industry/4253368.html.

(Continued)

*Primary Examiner* — Joseph Haley
*Assistant Examiner* — Ifedayo Iluyomade
(74) *Attorney, Agent, or Firm* — Brownstein Hyatt Farber Schreck, LLP

(57) ABSTRACT

Methods and systems for processing touch inputs are disclosed. The invention in one respect includes reading data from a multi-touch sensing device such as a multi-touch touch screen where the data pertains to touch input with respect to the multi-touch sensing device, and identifying at least one multi-touch gesture based on the data from the multi-touch sensing device and providing an appropriate multi-haptic response.

20 Claims, 21 Drawing Sheets

(56) References Cited

U.S. PATENT DOCUMENTS

| | | |
|---|---|---|
| 2008/0068348 A1 | 3/2008 | Rosenberg et al. |
| 2008/0084384 A1 | 4/2008 | Gregorio et al. |
| 2008/0111788 A1 | 5/2008 | Rosenberg et al. |
| 2008/0170037 A1 | 7/2008 | Cruz-Hernandez et al. |
| 2009/0002328 A1* | 1/2009 | Ullrich et al. .................. 345/173 |
| 2009/0085878 A1* | 4/2009 | Heubel et al. .................. 345/173 |

OTHER PUBLICATIONS iPhone Haptics, http://code.google.com/p/iphone-haptics/.

* cited by examiner

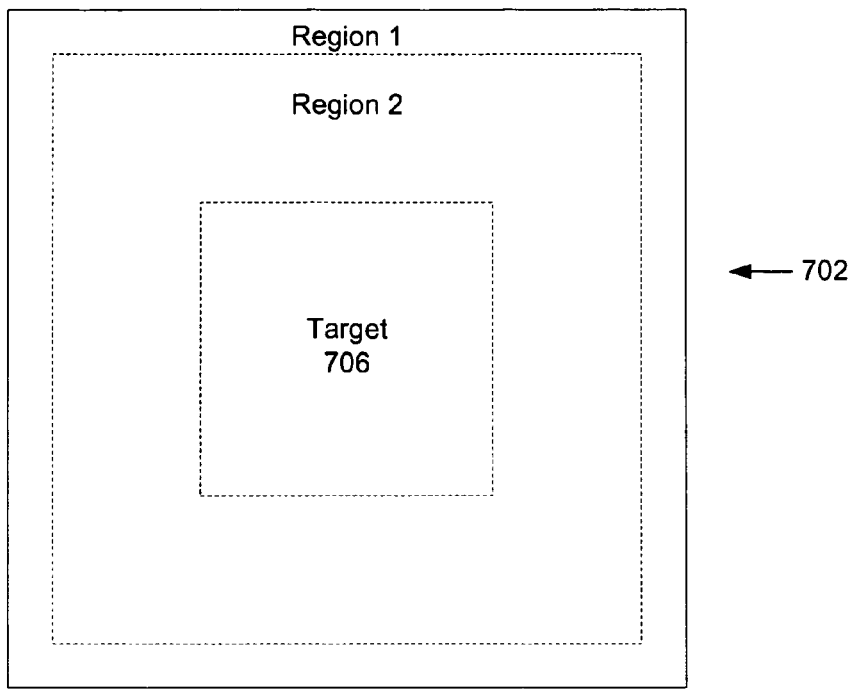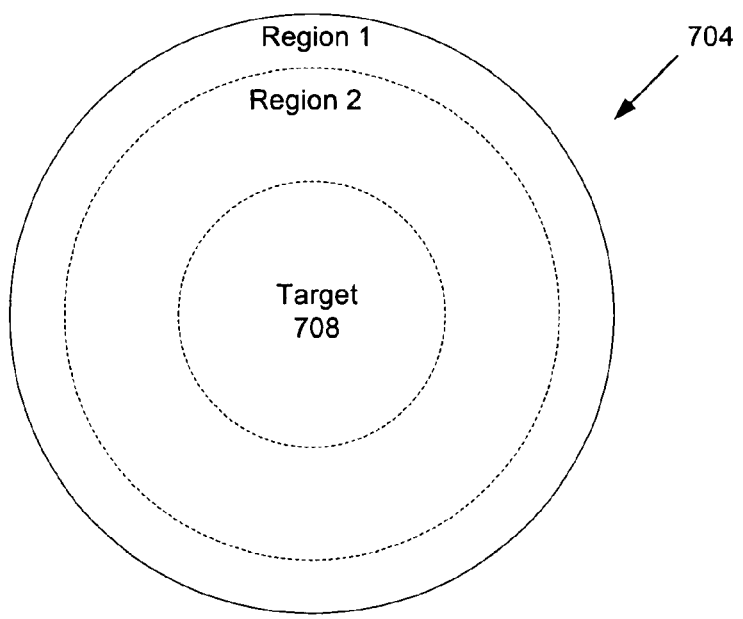
Fig. 7

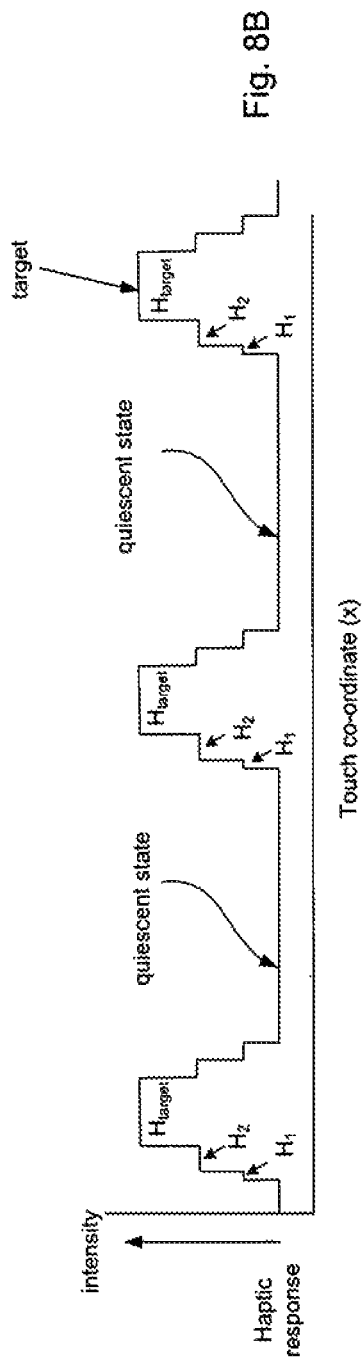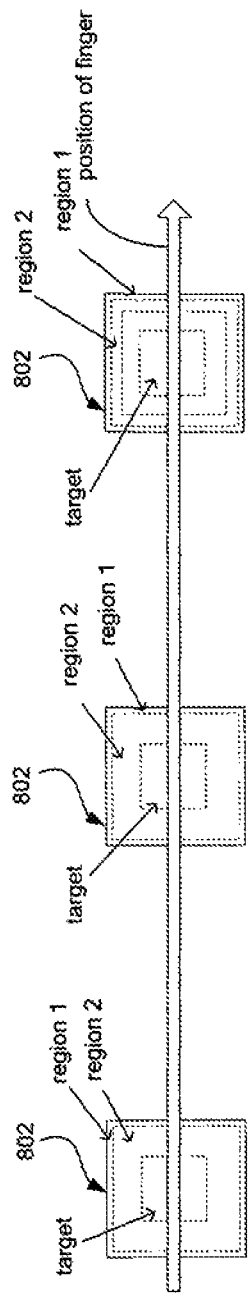
Fig. 8B
Fig. 8A

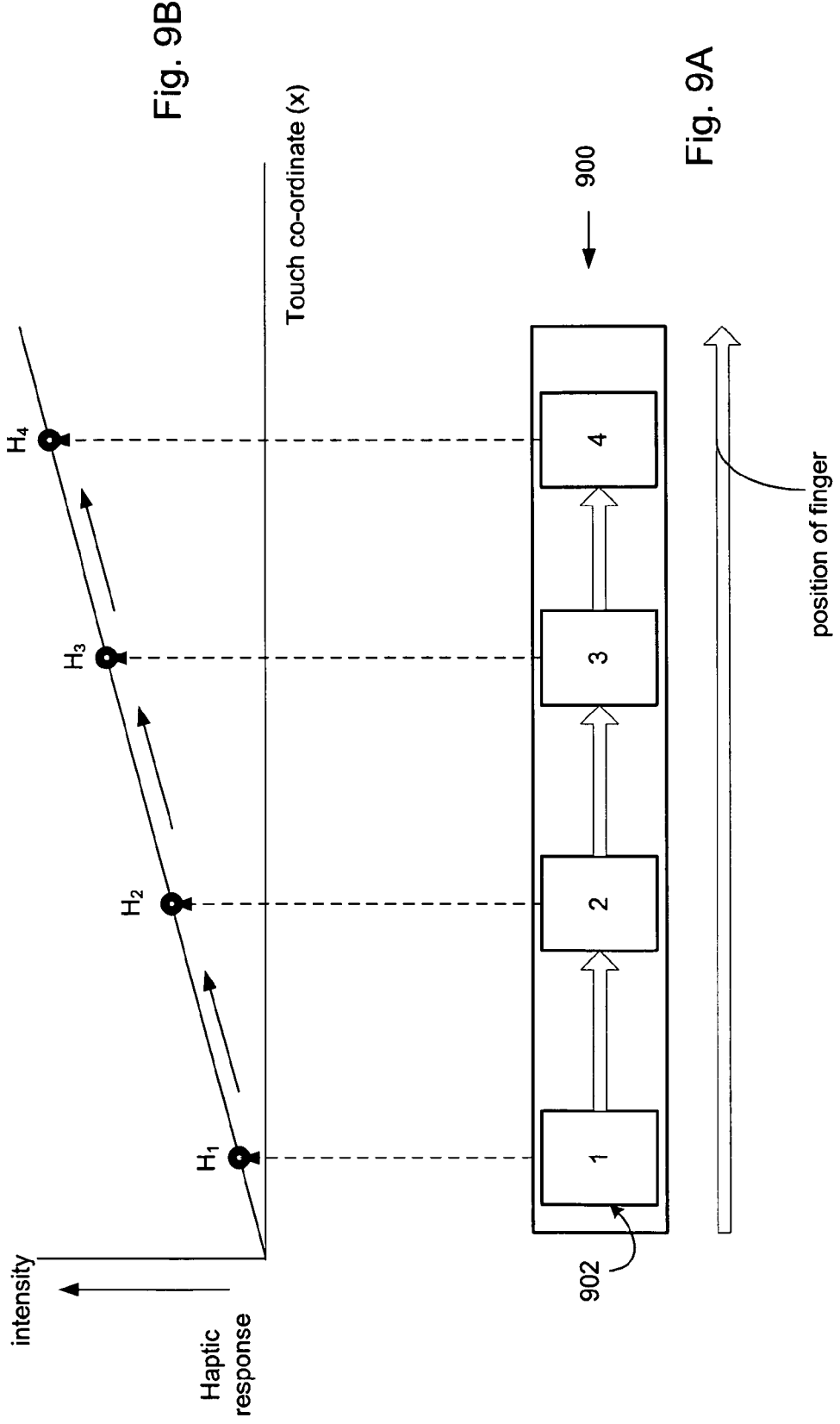

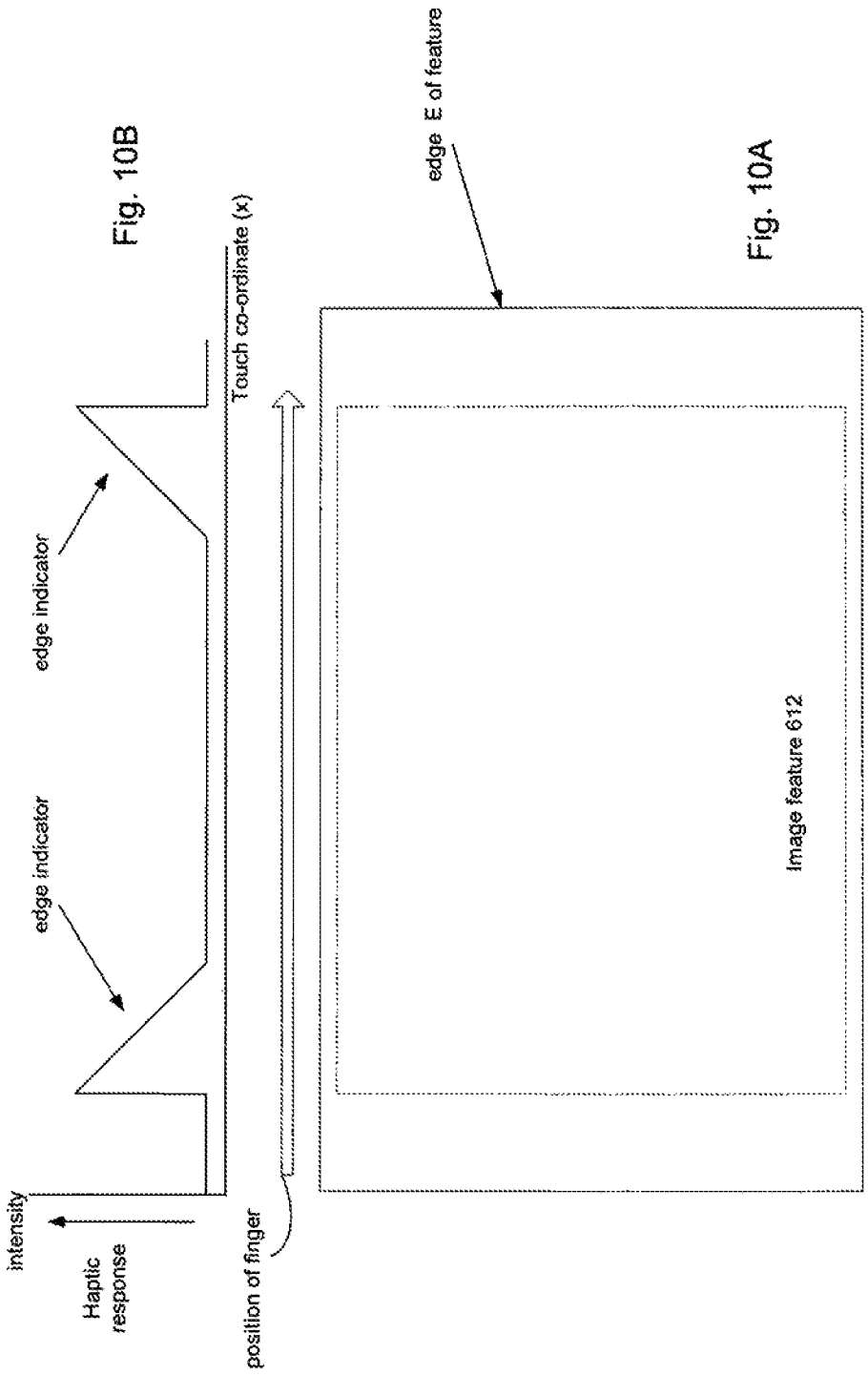

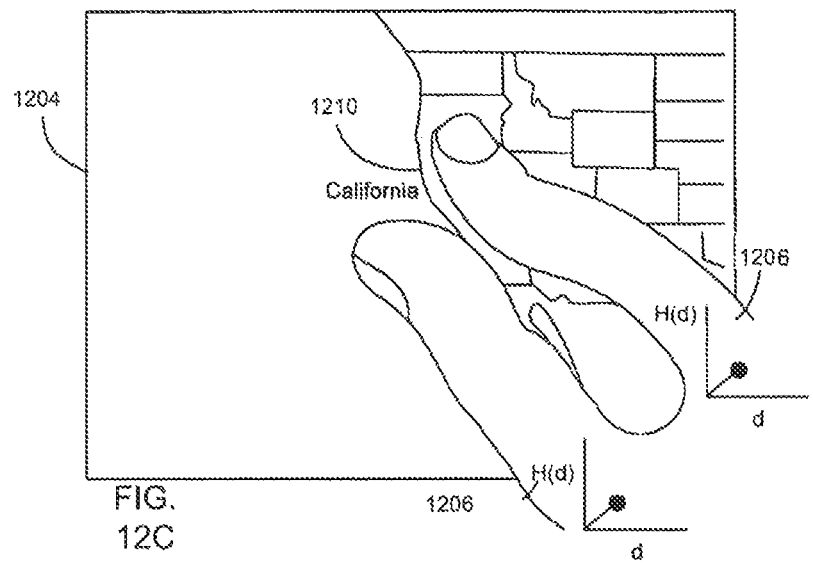
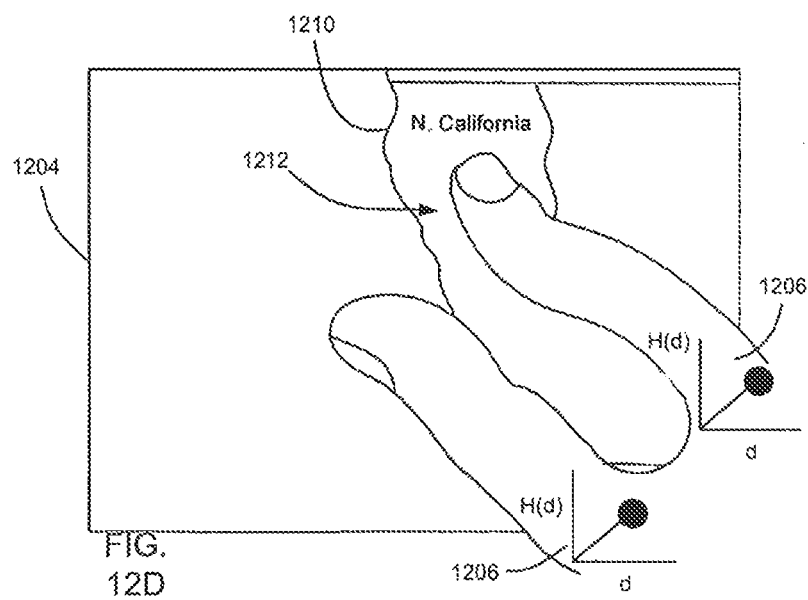

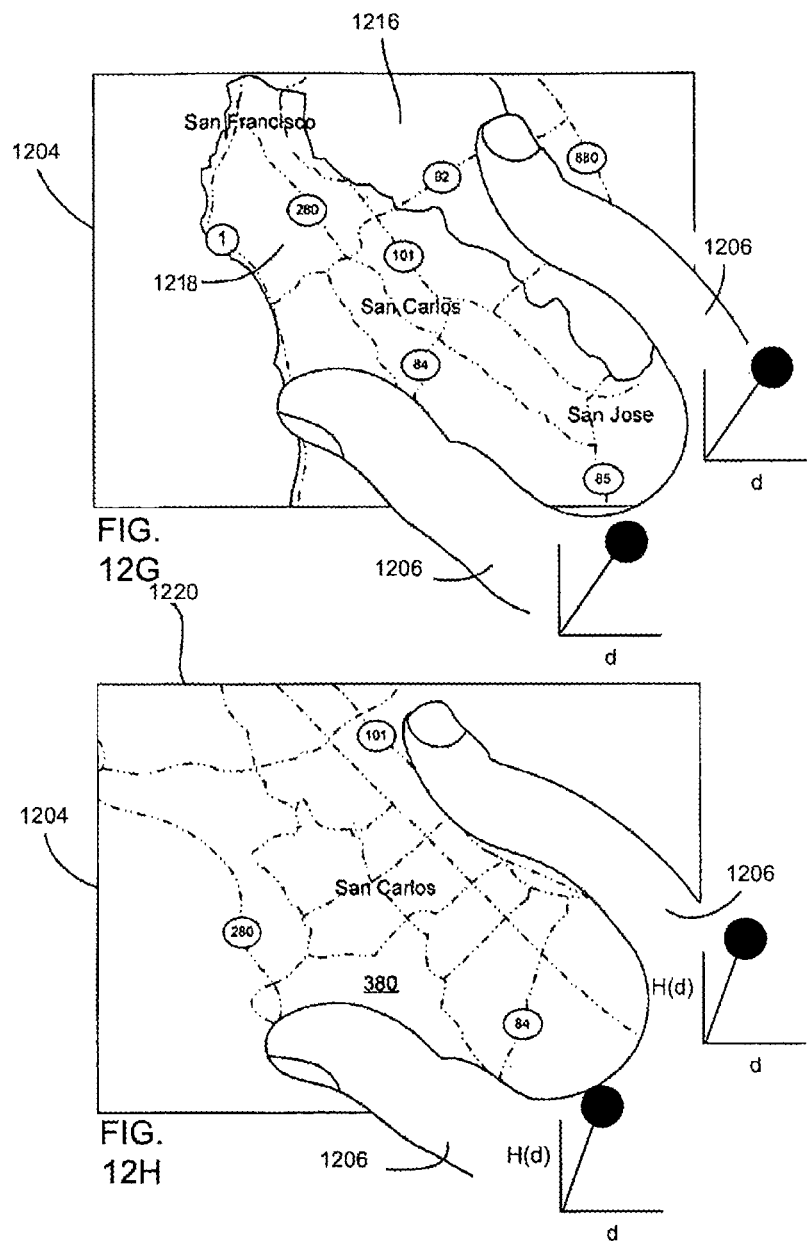

MULTI TOUCH WITH MULTI HAPTICS

CROSS-REFERENCE TO RELATED APPLICATIONS

This application is a continuation of U.S. patent application Ser. No. 12/419,174, entitled "MULTI TOUCH WITH MULTI HAPTICS", filed on filed Apr. 6, 2009, which claims priority under 35 U.S.C. 119(e) to U.S. Provisional Application No. 61/140,519 entitled MULTI TOUCH WITH MULTI HAPTICS, filed Dec. 23, 2008, both of which are incorporated by reference in their entirety as if fully disclosed herein.

BACKGROUND OF THE INVENTION

1. Field of the Invention

The present invention relates generally to providing multi-touch/multi-haptic systems and methods.

2. Description of the Related Art

Multi-touch devices have advantages over conventional single point sensing touch devices in that they can distinguish more than one object (finger) in contrast to single point devices that are simply incapable of distinguishing multiple objects. In most cases, multi-touch devices monitor a sensing surface for a touch or near touch, and when a touch occurs determines the distinct areas of contact and identifies the contacts via their geometric features and geometric arrangement. Once identified or classified, the contacts are monitored for various motions, actions or events. The contacts and motions thereof are then converted into inputs for controlling some aspect of an electronic device.

Multi-touch devices can be embodied in various forms including but not limit to standard touch pads, large extended palm pads, touch screens, touch sensitive housings, etc. Furthermore, multi-touch devices can be placed in various electronic devices including but not limited to computers such as tablet computers, laptop computers, desktop computers as well as handheld computing devices such as media players (e.g., music, video, games), PDAs, cell phones, cameras, remote controls, and/or the like. The multi-touch devices can also be placed on dedicated input devices such as touch screen monitors, keyboards, navigation pads, tablets, mice, and the like. Essentially, multi-touch devices can be applied to any surface, and can be found in any consumer electronic product that requires inputs.

Since multi-touch devices provide a number of inputting operations at a single location (input surface), inputting with multi-touch devices can be very efficient. The user can maintain their hand(s) at the multi-touch surface without having to move their hand(s) to address other input devices. For example, conventional systems typically include a keyboard and a separate mouse. In order to use the mouse, the user must move their hand from the keyboard and onto the mouse. In order to keyboard efficiently (both hands), the user must move their hand from the mouse to the keyboard. This inputting sequence is very inefficient. For one, only one device can be used effectively at a given time. For another, there is wasted time between each inputting step. In contrast, with multi-touch surfaces the user can generate both static commands (e.g., keyboarding) and manipulative commands (e.g., tracking) from the same location and at the same time. The user therefore does not have to move their hands to perform different inputting tasks. The user simply provides different chords or finger motions to generate a number of inputs either sequentially or simultaneously. In one example, the user can provide key commands with taps at specific locations of the multi-touch surface while allowing tracking from all locations of the multi-touch surface.

However, research has shown that providing the multi-touch surface with the ability to provide physical (haptic) feedback makes the multi-touch experience even more efficient and realistic to the user. For example, physical keyboards provide a physical indication (a bump, for example) indicative of the home key. This physical sensation can not be provided by a conventional multi-touch system thereby forcing the user to visually locate the home key thereby making keyboard use less efficient and fatiguing. However, by providing a physical facsimile of the home key bump using an actuator that provides a physical sensation to the user providing an approximate representation of the bump, the user's experience of the MT keyboard (and any multi-touch system for that matter) can be more realistic and therefore more enjoyable.

Therefore, a system that enhances the multi-touch experience by incorporating a corresponding physical response(s) is described.

SUMMARY OF THE INVENTION

The invention relates, in one embodiment, to an apparatus and method for providing multi-touch haptic feedback. The apparatus includes, at least, a touch pad having a touch sensitive surface arranged to receive a user provided multi-touch event associated with at least two different locations on the touch sensitive surface, a multi-touch detection mechanism operatively coupled to the touch sensitive surface that detects the multi-touch event and generates a corresponding multi-touch signal, and a plurality of haptic feedback devices operatively coupled to the multi-touch detection mechanism and the touch sensitive surface cooperatively arranged to concurrently provide tactile feedback at each of the at least two different locations on the touch sensitive surface in response to the multi-touch signal wherein the tactile feedback at each of the at least two different locations are discreet from one another. When the multi-touch signal indicates that the multi-touch event is a dynamic multi-touch event indicating a change in the multi-touch event, then the tactile feedback at each of the at least two different locations is updated to reflect the change in the multi-touch event.

It should be noted that in some cases the tactile feedback event can be different for each of the at least two different locations.

The invention relates, in another embodiment, to a multi-touch haptic mechanism. The multi-touch haptic mechanism includes, at least, a touch pad having a touch sensitive surface arranged to detect a user touch event at substantially any location on the touch sensitive surface and a plurality of independent haptic devices operatively coupled to the touch sensitive surface each providing a corresponding type of tactile feedback thereby providing a tactile feedback at substantially any location on the touch sensitive surface at which the user touch event has occurred, wherein each of the plurality of independent haptic devices only responds to the user touch event in one or more associated regions of the touch sensitive surface. When at least two of the plurality of independent haptic devices cooperate to provide a type of haptic response that is different than that type provided by either of the at least two independent haptic devices separately.

The invention relates, in another embodiment, to an integrated device arranged to act as both a force sensing device and a haptic feedback device. The device includes, at least, a touch sensitive surface, a controller unit, and a mechanical actuator coupled with the controller unit and the touch sensitive surface. The integrated device acts as the force sensing device by generating an output voltage in direct proportion to a force applied to the mechanical actuator by a user touching the touch sensitive surface, sensing the output voltage by the controller unit and converting the sensed output voltage to an indication of the applied force. Only when the sensed output voltage exceeds a voltage threshold level does the integrated device act as the haptic feedback device by halting the sensing of the output voltage by the controller unit activating the mechanical actuator by the controller unit, wherein the activated mechanical actuator imparts a physical force to the touch sensitive surface that results in a vibro-tactile response (subcutaneous tissue activated) felt by the user commensurate with the force applied by the user.

The invention relates, in another embodiment, to an electronic device. The electronic device includes, at least, a touch pad having a touch sensitive surface arranged to process a user touch event and a plurality of haptic feedback devices each of which is operatively coupled to the touch sensitive surface and each responding to the user touch event only in a specific region of the touch sensitive surface and arranged to provide tactile feedback singly or in combination with others of the plurality of haptic feedback devices in response to the user touch event. When the touch sensitive regions of at least two of the plurality of haptic devices overlap, if the user touch event occurs in the overlapping region, then the at least two haptic devices cooperate to provide a combined haptic feedback response based upon the location in the overlapping region of the user touch event.

The invention relates, in another embodiment, to an electronic device. The electronic device includes, at least, a touch pad having a touch sensitive surface arranged to receive a user touch event provided by a user, a controller coupled and in communication with the touch pad arranged to at least analyze the user touch event and/or a state of the touch pad and based upon the analysis provide a user touch event signal in response to the user touch event, and at least one haptic device operatively coupled to the controller arranged to receive the user touch event signal, wherein the at least one haptic device responds to the user touch event signal by providing an appropriate haptic feedback response to the user based upon the analysis provided by the controller.

In one embodiment, the touch sensitive surface is arranged to receive different types of user touch events each being characterized by an amount of pressure applied to the touch sensitive surface by a user and at least one haptic device operatively coupled to the touch sensitive surface arranged to provide a specific type of tactile feedback corresponding to the amount of pressure applied to the touch sensitive surface by the user.

It should be noted that in each of the embodiments described above, the methods can be implemented using a touch based input device such as a touch screen or touch pad, more particularly a multi-touch touch based input device, and even more particularly a multi-touch touch screen. It should also be noted that the gestures, gesture modes, gestural inputs, etc. can correspond to any of those described below in the detailed description. For example, the gestures can be associated with zooming, panning, scrolling, rotating, enlarging, floating controls, zooming targets, paging, inertia, keyboarding, wheeling, and/or the like.

BRIEF DESCRIPTION OF THE DRAWINGS

The invention will be readily understood by the following detailed description in conjunction with the accompanying drawings, wherein like reference numerals designate like structural elements, and in which:

FIG. 7 shows representative GUI button elements in accordance with an embodiment of the invention.

FIGS. 8A-8B shows representative GUI button element and associated haptic profile in accordance with an embodiment of the invention.

FIGS. 9A-9B shows a representative slider element and associated haptic profile in accordance with an embodiment of the invention.

FIGS. 10A-10B shows a feature edge detection system in accordance with an embodiment of the invention.

FIGS. 12A-12H illustrates a display presenting a GUI object in the form of a map of North America with embedded levels which can be zoomed.

DETAILED DESCRIPTION OF SELECTED EMBODIMENTS

Figure 1A:
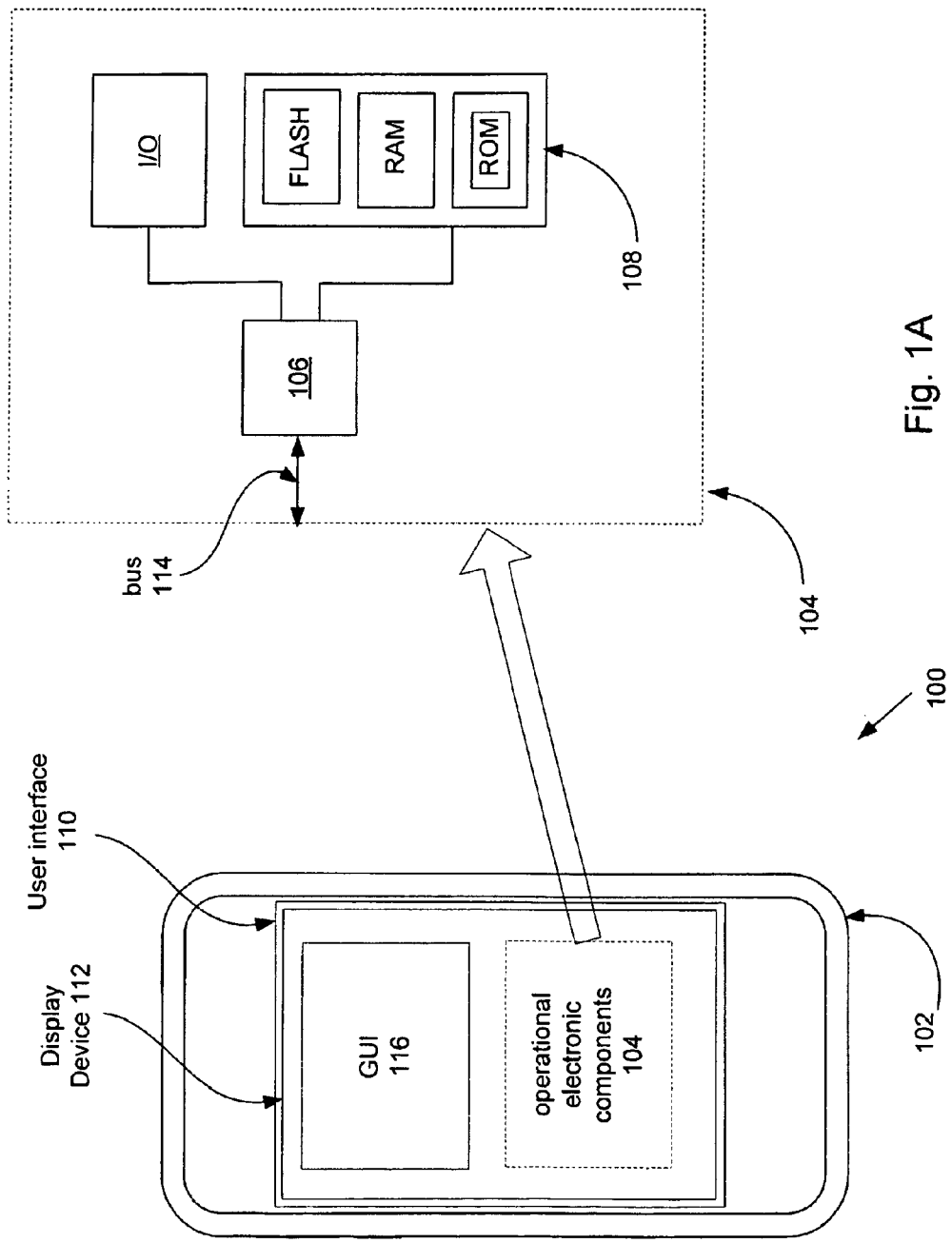
FIGS. 1A-1E are a series of block diagrams of a system, in accordance with one embodiment of the present invention.

Reference will now be made in detail to selected embodiments an example of which is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as can be included within the spirit and scope of the invention as defined by the appended claims.

The invention relates to multi-touch haptic feedback. Multi-touch haptic feedback refers to haptic techniques capable of providing multiple and discretely located haptic sensations across a surface. The haptic system can for example include a plurality of haptic nodes, each of which is capable of issuing vibro-tactile sensations (at the same time or different times and with the same intensity or different intensity). The haptic nodes can for example be configured in a matrix or array. In one embodiment, the haptic nodes are mapped to touch sensing nodes. Each touch sensing node can be assigned one or more haptic nodes. The haptic nodes are typically proximate the touch sensing nodes to which it has been assigned.

In one embodiment, the touch sensing surface is a multi touch surface thus making a multi touch multi-touch haptic device. In so doing haptic feedback can be provided that indicates information about a multi touch event. For example, the surface under a moving finger can be actuated while the surface under the non-moving finger remains static. In another example, the surface under the moving finger is actuated concurrently with a signal being passed to the other finger indicating that a multi touch action is occurring. In this way, the signals taken together can indicate the nature of the underlying action being taken by the user. For example, if an object (such as an image) is being expanded or reduced in size a larger/more intense signal could be generated (either by increasing frequency or amplitude). It is also contemplated that isolated feedback can be used to provide an on-screen click-wheel or other such user input where the touch screen is used to simulate the "clicks" of the click wheel both audibly and via tactile feedback.

The described embodiments generally pertain to gestures and methods of implementing gestures with associated physical feedback with touch sensitive devices. Examples of touch sensitive devices include touch screens and touch pads. One aspect of the invention describes a touch sensitive input device able to recognize at least two substantially simultaneously occurring gestures using at least two different fingers or other objects (hereinafter referred to as a multi-touch event). The touch sensitive input device communicates with an array of haptic feedback devices (also referred to as haptic actuators) each arranged to provide haptic feedback according to a haptic profile in response to a multi-touch event. In another aspect of the invention, each finger receives different haptic feedback (multi-haptic) depending upon the location on the touch sensitive input device each finger is placed. In another aspect of the invention, a compound haptic feedback can be provided that combines the output from at least two different haptic actuators to form the compound response that is different from that provided by the two originating haptic actuators. In another embodiment, an integrated device is described that can act as both a force sensing device and a haptic feedback device. In still another embodiment, a handheld portable device is described having a housing and a user interface are acoustically isolated from each other. In this way, the housing and user interface and having non-interfering and independent haptic responses.

These and other aspects of the invention are discussed below with reference to FIGS. 1-13. However, those skilled in the art will readily appreciate that the detailed description given herein with respect to these figures is for explanatory purposes as the invention extends beyond these limited embodiments.

FIG. 1A-1E are block diagrams of a representative electronic device or system 100, in accordance with one embodiment of the present invention. Electronic device 100 can correspond to a computer (such as a desktops or laptops) as well as small form factor electronic devices that can include portable consumer electronic products such as cell phones, PDA, media players and/or the like. As such, portable electronic device 100 can be sized for one-handed operation and placement into small areas such as a pocket. Portable electronic device 100 can process data and more particularly media such as audio, video, images, etc. As such, the portable electronic device 100 can correspond to a music player, game player, video player, personal digital assistant (PDA), such as, for example, an iPod™, an iPod Nano™, an iPod Shuffle™, an iPod™ Touch or an iPhone™ available by Apple Inc. of Cupertino, Calif. In some cases, portable electronic device 100 can communicate wirelessly (with or without the aid of a wireless enabling accessory system) and/or via wired pathways (e.g., using traditional electrical wires).

Portable electronic device 100 includes a housing 102. Housing 102 can be formed of any number of materials including for example plastics, metals, ceramics and the like. In one embodiment, housing 102 can be formed of stainless steel in order to provide an aesthetic and appealing look and feel as well as provide structural integrity and support for all sub-assemblies installed therein. Housing 102 can define a cavity configured to at least partially enclose any suitable number of operational electronic components 104 used by portable electronic device 100 to carry out its intended functions. Operational electronic components 104 can include processor 106 that can operate (in conjunction with an operating system) to execute computer code and produce and use data. Processor 106 can be implemented on a single-chip, multiple chips or multiple electrical components. For example, various architectures can be used for the processor 106, including dedicated or embedded processor, single purpose processor, controller, ASIC, and so forth. The operating system, other computer code and data can reside within a memory 108 that can be operatively coupled to processor 106. By way of example, memory 108 can include Read-Only Memory (ROM), Random-Access Memory (RAM), flash memory, hard disk drive and/or the like. Operational components 104 can also include a number of input/output (I/O) devices 109. Such devices can include audio output devices such as headphone jacks, data ports (such as I.E.E.E. 1392 compliant, USB, etc.), and so on.

Portable electronic device 100 can also include a user interface 110 that can operate to both receive user inputs and provide information to a user. In the described embodiment, user interface 110 can include display device 112 that can be operatively coupled to processor 106 by way of bus 114. Display device 112 can correspond to any known display technology such as a plasma, LCD, or an organic light emitting diode (OLED). It should be noted that in the embodiment shown in FIGS. 1A-1E, display device 112 is integrated with the electronic device 100. However, display device 112 can also be configured as a component separate from portable electronic device 100 in which case display device 112 would be considered a peripheral device that can be coupled to portable electronic device 100 by way of a wired connection (such as a peripheral bus or cable) or a wireless connection such as IR, RF, Bluetooth or the like (among others).

In some cases, display device 112 presents graphical user interface (GUI) 116 on display device 112. GUI 116 can provide an easy to use interface between a user of portable electronic device 100 and the operating system or application running thereon. Generally speaking, GUI 116 iconically represents programs, files and operational options with graphical images. The graphical images can include windows, fields, dialog boxes, menus, icons, buttons, cursors, scroll bars, etc. Such images can be arranged in predefined layouts, or can be created dynamically to serve the specific actions being taken by a user. During operation, the user can select and activate various graphical images in order to initiate functions and tasks associated therewith. By way of example, a user can select a button that opens, closes, minimizes, or maximizes a window, or an icon that launches a particular program. GUI 116 can additionally or alternatively display information, such as non interactive text and graphics, for the user on the display device 112.

Figure 1B:
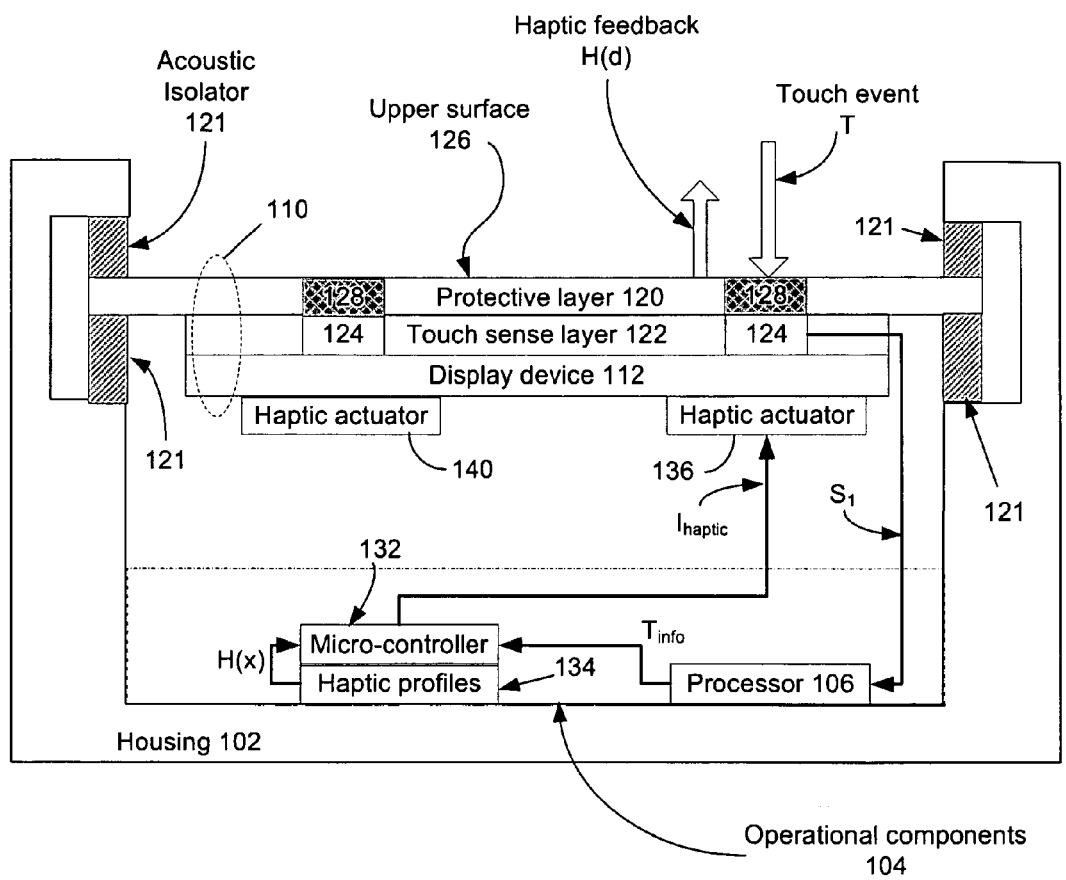

As shown more clearly in FIG. 1B in a side view perspective of device 100, user interface 110 can include protective layer 120 disposed on top of display device 112. In this way, protective layer 120 can be used as protective top layer of transparent or semitransparent material (clear) thereby affording display device 112 protection from potentially damaging external insults caused by, for example, sharp objects, dropping, and so on and yet still allow any image presented by display device 112 to be clearly viewed by a user. Protective layer 120 can be formed of many well known transparent materials such as glass (e.g., referred to as cover glass), and more particularly highly polished glass. It should be appreciated, however, that other transparent materials (or at least translucent materials) such as clear plastic may also be used. In some embodiments, protective top layer 120 can be acoustically isolated from housing 102 using, for example, acoustic isolation buffers 121. By acoustically isolating housing 102 and protective top layer 120 from each other, it is possible to provide separate and independent haptic responses, one directed at housing 102 and another directed at protective top layer 120 without interfering with each other. For example, it may be desirable to provide one type of haptic response at protective layer 120 and another type haptic response at housing 102 at the same time or at a different time independent of each other or in some cases one being the result of or related to the other.

User interface 110 can be touch sensitive suitable for receiving one or more user touch events by which information can be passed between the user and the portable electronic device 100. In some cases, the one or more inputs in the form of user touch events can be substantially simultaneously received (e.g., multi-touch). In these embodiments, user interface 110 is rendered touch sensitive by means of a touch sensing layer 122 that can be disposed below protective layer 120 such that touch sensing layer 122 is between protective layer 120 and the display device 112. This arrangement can be accomplished by, for example, applying touch sensing layer 122 to display device 112 or by applying touch sensing layer 122 to protective layer 120 using any number of attachment processes, such as printing, depositing, laminating, etc. Touch sensing layer 122 generally includes at least one touch sensing device 124 configured to detect an object in close proximity to or exerting pressure on an upper surface 126 of protective layer 120. In keeping with the wide applicability of the invention, sensing device 124 can be widely varied and can be configured to activate as the finger touches the upper surface 126. In the simplest case, an electrical signal is produced each time a finger (or other appropriate object) passes a sensor. The number of signals in a given time frame may indicate location, direction, speed and acceleration of the finger on the touch sensitive portion, i.e., the more signals, the more the user moved his or her finger.

Touch sensing layer 122 can be configured to act as a multi-touch input device. Multi-touch input devices have several advantages over conventional single point devices in that they can distinguish more than one object (finger). As a multi-touch input device, touch sensing layer 122 can distinguish a wide range of different gestures. By way of example, the gestures may be single point or multi-touch gestures, static or dynamic gestures, continuous or segmented gestures, and the like. It should be noted that single point gestures are those gestures that are performed with a single contact point, e.g., the gesture is performed with a single touch as for example from a single finger, a palm or a stylus. Multi-touch gestures are those gestures that can be performed with multiple points, e.g., the gesture is performed with multiple touches as for example from multiple fingers, fingers and palms, a finger and a stylus, multiple styli and/or any combination thereof. Static gestures are those gestures that do not include motion, and dynamic gestures are those gestures that do include motion. Continuous gestures are those gestures that are performed in a single stroke, and segmented gestures are those gestures that are performed in a sequence of distinct steps or strokes.

Touch sensing device 124 can be sensitive to at least one of several independent and spatially distinct touch sensing nodes or regions 128. Touch sensing device 124 can positioned throughout touch sensing layer 122. Sensing regions 128 are typically not visible to the user and dispersed about protective layer 120 with each sensing region 128 representing a different position on surface 126 in coordination with the locations of sensing device 124. Sensing regions 128 can be positioned in a grid or other such array where each sensing region 128 can generate a signal in response to a user touch event in proximity thereto. Typically, the number of fingers in contact with the surface 126 can indicate an input mode. For example, a single touch by one finger can indicate the desire to perform tracking, i.e., pointer or cursor movements, or selections. On the other hand, multiple touches using, for example, a group of fingers can indicate the desire to perform gesturing. The number of fingers in the group used for implementing gesturing may be widely varied. By way of example, two fingers can indicate a first gesture mode, three fingers may indicate a third gesture mode, etc. Alternatively, any number of fingers, i.e., more than one, may be used for the same gesture mode, which can include one or more gesture controls.

The number and configuration of sensing nodes 128 can be widely varied. The number of sensing nodes 128 generally depends on the desired sensitivity as well as the desired transparency of touch sensing layer 122. For example, more nodes or sensing nodes generally increases sensitivity, but may reduce transparency (and vice versa). With regards to configuration, sensing nodes 128 generally map touch sensing layer 122 into a coordinate system such as a Cartesian coordinate system, a polar coordinate system or some other coordinate system. When a Cartesian coordinate system is used (as shown), sensing regions 128 typically correspond to x and y coordinates. When a polar coordinate system is used, the sensing nodes typically correspond to radial (r) and angular coordinates ($\theta$). In this way, touch sensing layer 122 can track multiple objects, such as fingers, which rest on, tap on, or move across an upper surface 126 of protective layer 120. In this way, a user can perform several touch initiated tasks at the same time. For example, the user can select an onscreen button with one finger, while moving a cursor with another finger. In addition, a user can move a scroll bar with one finger while selecting an item from a menu with another finger. Furthermore, a first object can be dragged with one finger while a second object can be dragged with another finger.

In the simplest case, a touch event T is initiated each time an object, such as a user's finger, is placed on upper surface 126 over, or in close proximity to, sensing region 128. Pressure generated by touch event T is transmitted through protective layer 120 at sensing region 128 to sensing device 124. In response to the pressure applied by the user during touch event T, sensing device 124 generates touch signal $S_1$ (and any other signal consistent with a multi-touch event). Touch signal $S_1$ can be monitored by an electronic interface (not shown) and passed to processor 106. Processor 106, in turn, can convert the number, combination and frequency of the signal(s) S into touch information $T_{info}$ that can include location, direction, speed and acceleration information of touch event T. Processor 106 can then pass touch information $T_{info}$ to micro-controller 132. Although micro-controller 132 is shown as a component separate from processor 106, it is contemplated that functions carried out by micro-controller 132 can in fact be performed by processor 106.

Micro-controller 132 can use touch information $T_{info}$ to query haptic data base 134 that includes a number of predetermined haptic profiles each of which describes a specific haptic response $H_x$, in terms of duration of response, type of vibro-tactile response, strength of response, etc. A particular haptic profile includes a set of instructions that cause micro-controller 132 to activate at least haptic actuator 136. Haptic actuator 136, in turn, creates haptic response $H_x$. In this way, the response of haptic actuator 136 can be controlled in real time by microprocessor 132 by establishing the duration, strength, type of vibro-tactile response $H_x$. Furthermore, the visual information presented on display 112 and the corresponding tactile response can be closely linked. For example, if the location of touch event T coincides with a visual display of a button icon generated by display device 112, the corresponding haptic response provided by haptic actuator 136 can have a haptic profile $H_{button}$ consistent with that of a dome button.

In some embodiments it may be desirable to associate each sensing node 128 with one or more corresponding haptic actuators. For example, sensing node 128 can trigger haptic actuator 136 and/or 140 or even 142 independent of each other or in concert. Accordingly, sensing nodes 128 can be arranged in such a way as two or more haptic actuators can cooperate to produce a compound haptic effect. It should be noted that an effective range R (distance over which a particular haptic actuator can be felt) for each of the haptic actuators can be based upon many factors such as intrinsic nature of the haptic actuator (i.e., mechanical vs EPAM), the damping properties of protective layer 120, the harmonic frequency of the device 100, and so on.

Figure 1C:
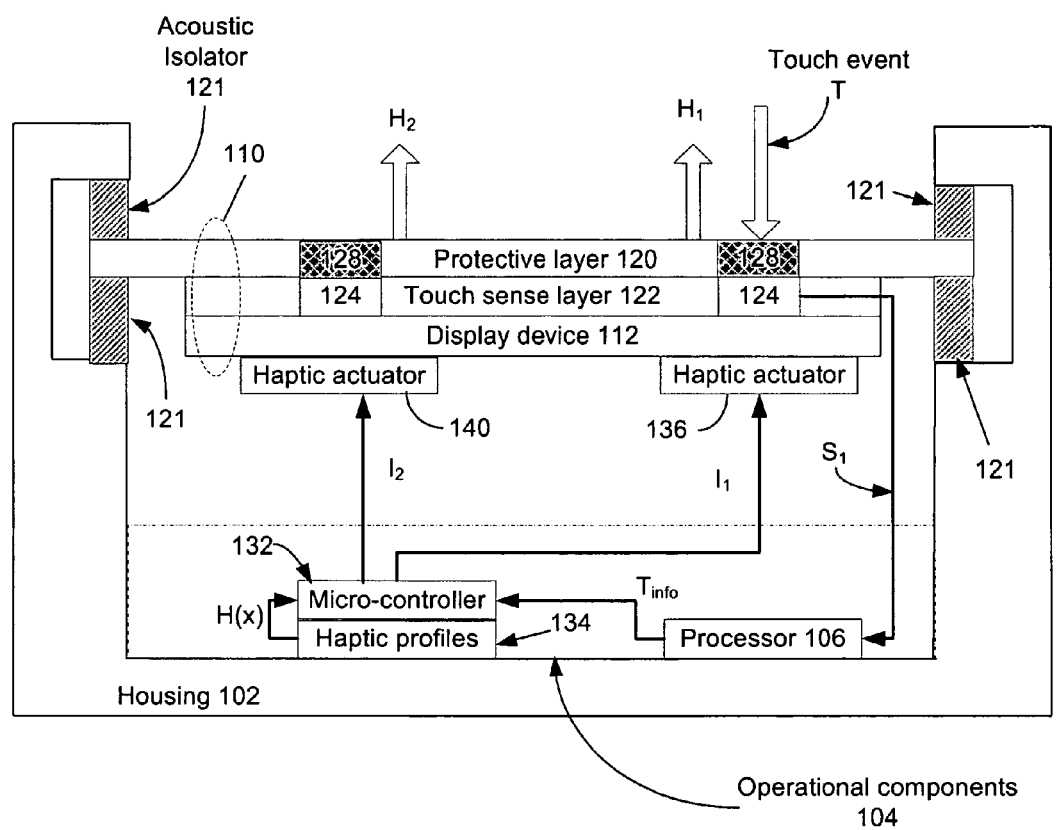
Figure 1D:
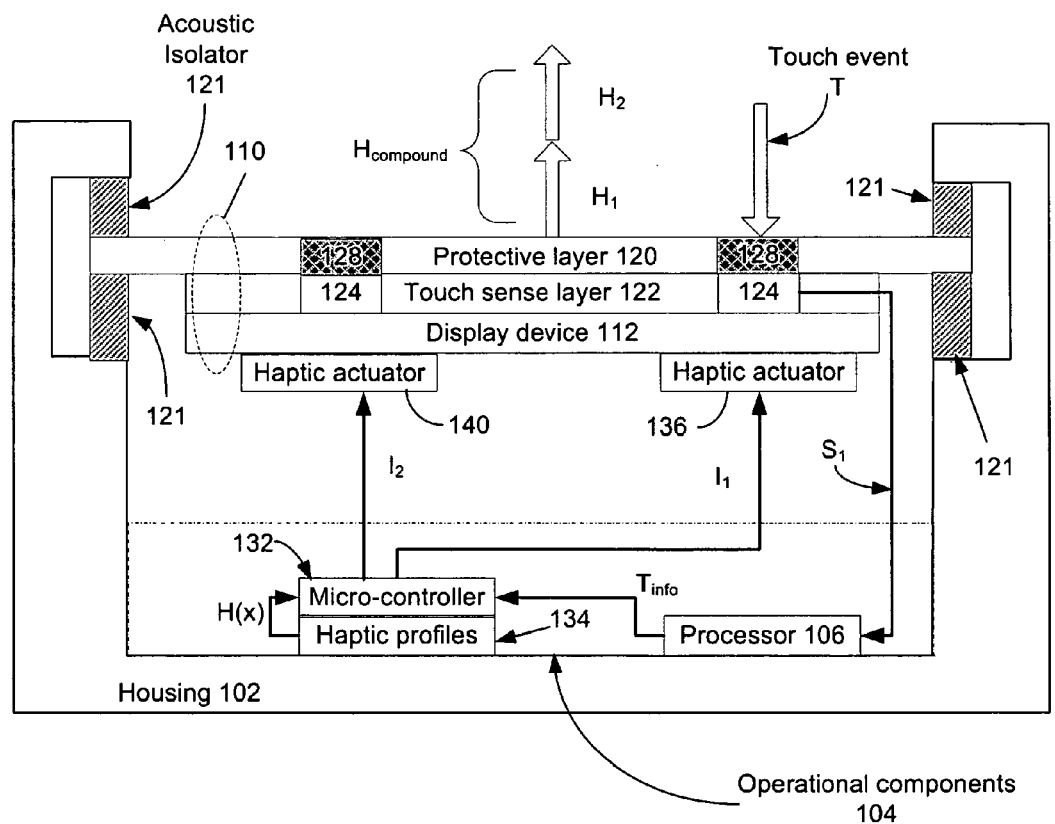
Figure 1E:
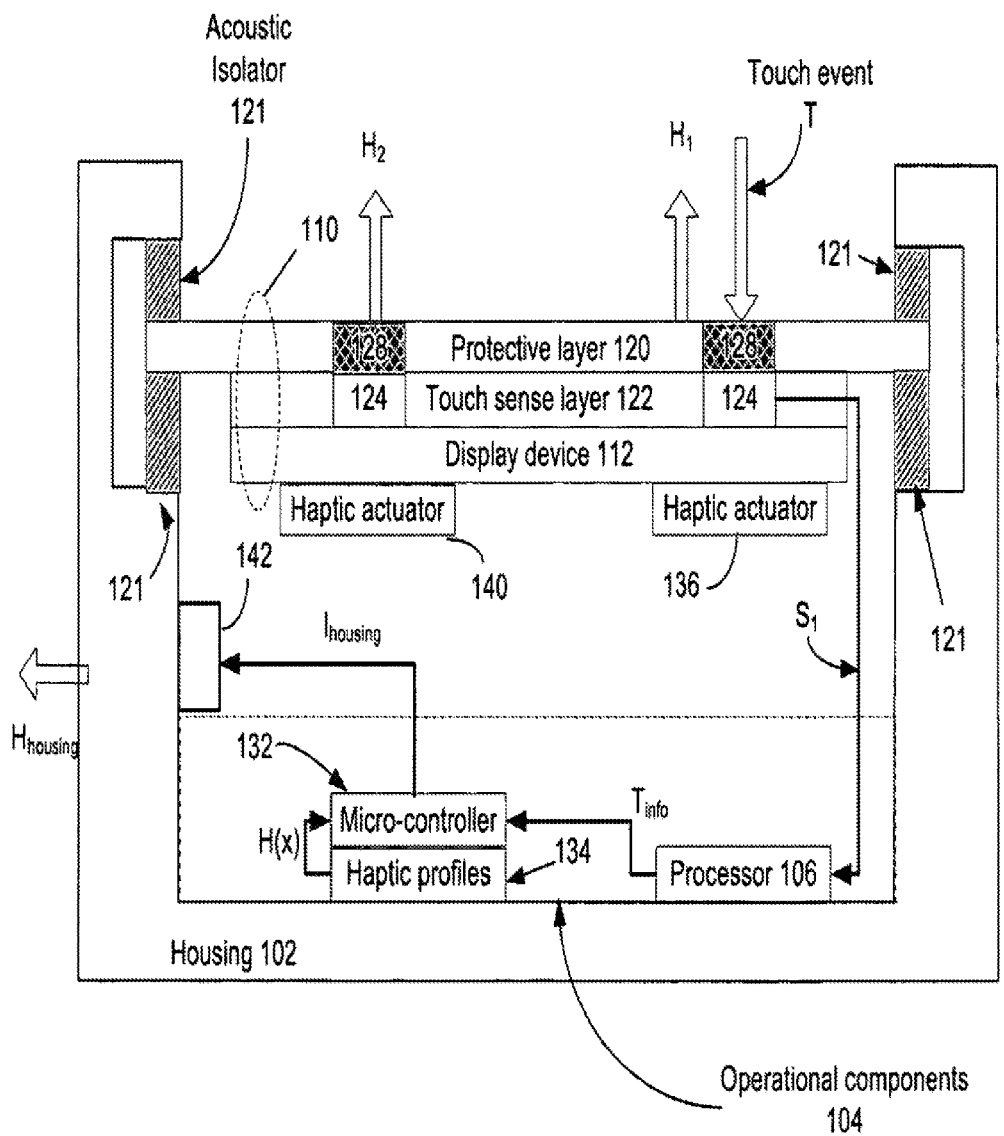

As shown in FIGS. 1C-1E, touch event T can result in multiple haptic actuators 136 being activated each being driven by a separate set of instructions based upon different haptic profiles. For example, as shown in FIG. 1C, haptic actuator 136 can respond with haptic effect $H_1$ whereas haptic actuator 140 can respond with haptic effect $H_2$ (or $H_1$ for that matter). In some cases as shown in FIG. 1D, a compound haptic effect $H_{compound}$ can be generated by providing the same or different haptic profiles to at least two different haptic actuators which interfere with each other (either constructively or destructively) to form compound haptic effect $H_{compound}$. Still further, as shown in FIG. 1E, due to the fact that housing 102 and user interface 110 are acoustically isolated from each other, haptic actuator 142 can be used to provide a haptic response directed at housing 102 independent of any haptic response or responses directed at user interface 110. For example, touch event T can cause processor 106 to direct microcontroller 132 to instruct haptic actuator 142 to produce haptic effect $H_{housing}$ (such as vibrate housing 102) at the same time as instructing haptic actuators 136 (and/or 140) to generate a haptic response $H_1$ and/or $H_2$. In this way, a user will feel housing 102 vibrate independent of any tactile response emanating from display interface 110 (and more particularly protective layer 120) thereby increasing the amount and variety of information that can be provided to (and by) the user. In this way, user interface 110 using display device 112 and haptic actuator 136 can provide both visual and tactile information to the user.

It should be noted that haptic actuator 136 can be formed as a small and thin chip and thus can be installed into the mobile apparatus such as small form factor/handheld devices such as cell phones, media players, and the like and can be electro-polymer based, piezo-electric based, or any combination thereof. In this way, user interface 110 using display device 112 and haptic actuator 136 can provide both visual and tactile information to the user. Furthermore, the components of the device 100 can be chosen to provide more effective haptic sensations. For example, if haptic actuator 136 oscillates at close to a natural frequency of the mechanical system (including the actuator itself), then stronger forces and more effective haptic sensations can be output. Accordingly, the mass (as well as the spring constants of the system 100) can be selected to provide a desirable low natural frequency, such as about 120 Hz or less, which tends to cause effective haptic sensations. It should also be noted that multiple haptic actuators can be driven in unison for stronger haptic effects or at different times to provide sensations at particular locations of surface 126.

One of the advantages of the invention lies in the fact that the relationship between a touch event or a class of touch events and corresponding haptic response can be dynamic in nature. By dynamic it is meant that although specific haptic profiles H stored in haptic profile data base 134 remain static, the haptic profile (or profiles) used to respond to a particular touch event T can be varied based upon any number of factors. For example, if touch event T coincides with a particular GUI icon displayed by display device 112 (such as the button icon described above), the corresponding haptic response $H_x$ can vary depending upon not only the icon displayed but also the location on surface 126 of touch event T (i.e., T(x)), any finger motion ($\partial T/\partial x, \partial T/\partial y$), any pattern of lifting a finger and placing it back down on surface 126 (i.e., $$\left(\frac{\Delta T}{\Delta t}\right)$$

such as multiple clicks in the case of a button icon, and so on. For example, vibrations can be adjusted based on a change in touch characteristics (i.e., speed, direction, location, etc.) whereas different vibrations can signify different events or regions. Furthermore, vibrations can be mapped to animation effects occurring on display 112 (rubber band, bounce etc.) or be based on location in the form of an intensity map on the surface 126.

Haptic actuators associated with system 100 can be arranged in groups. For example, one such group can include a primary haptic actuator arranged to provide a vibro-tactile response and at least one secondary device selected from piezo-ceramic element or EPAM arranged to provide another type response. In this way, the primary haptic actuator can be utilized to convey a status (e.g., incoming call) as well as passive responses to touch events such as location of input areas (e.g., virtual buttons) while the secondary device can be utilized to convey active responses to touch events such as signifying that an action was taken (e.g., button click). In some cases, a second secondary haptic device can be used to convey other active or passive responses. Some haptic devices (such as the secondary ones mentioned above) can be better at simulating mechanical clicks (e.g., dome switch) making the user experience similar to what they are used to in legacy devices that utilize mechanical inputs (switches) instead of electrical inputs (touch sensing).

Figure 2A:
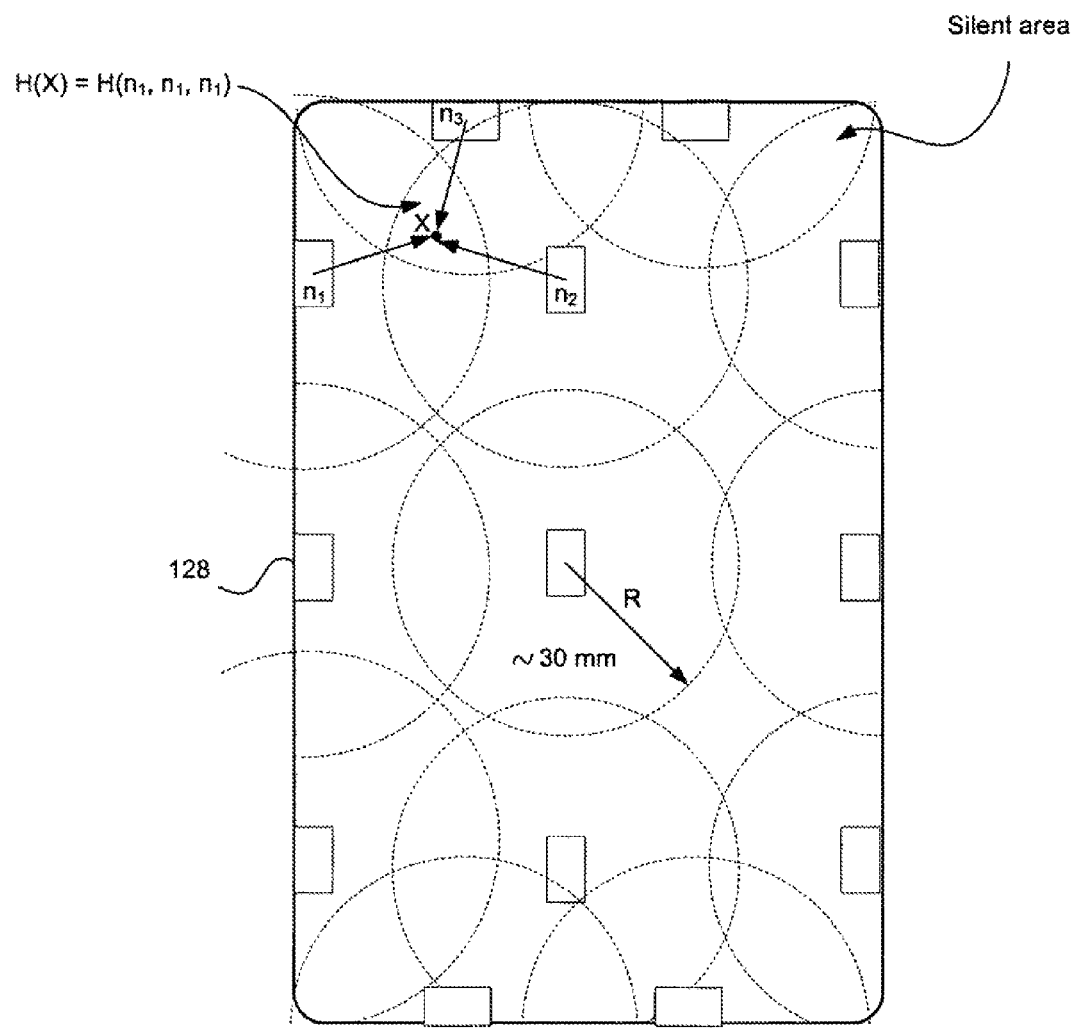
FIGS. 2A-2B shows a multi-point multi-haptic system having a multi-touch surface that incorporates a plurality of haptic devices in accordance with an embodiment of the invention.

By judiciously selecting appropriate materials, haptic response of device 100 can be adjusted based upon the acoustic properties of the materials that go into creating device 100. Protective layer 120 can be formed from a material with localized damping properties such that vibro-tactile sensations in one quadrant are not substantially felt in another. For example, protective layer 120 can be glass or other transparent (or at least translucent) material having natural damping properties suitable for small form factor devices having small area displays. Generally speaking, substantially all of protective layer 120 can be provided with haptic sensations as a single unitary member, however, it is possible to provide for individually-moving portions of protective layer 120 by providing each portion with their own haptic actuator where the haptic responses can be limited to particular region of surface 126 with effective range R as shown in FIG. 2A. In this way, haptic sensations can be provided for only a particular portion of protective layer 120 using the natural damping factor of glass to limit the effective range of the actuator. Moreover, the properties of protective layer 120 can be selected such that vibro-tactile transmissions from at least two haptic actuators can interfere with each other, either constructively or destructively, in order to provide a compound haptic sensation.

Figure 2B:
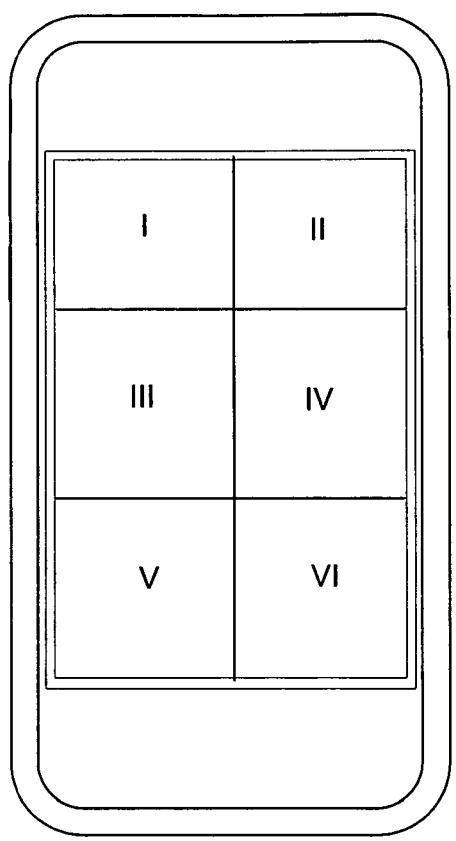

Although the resolution can be widely varied, in one embodiment, sensing regions 128 are placed coarsely about the surface. By way of example, sensing regions 128 can be placed at several quadrants (groups of touch sensors). As illustrated in FIG. 2B, a surface 126 (as a rectangle) can include about n actuators with a concomitant number of sensing regions 128 in order to create vibro-tactile sensations within about n quadrants of the rectangular oriented touch surface. For example, if n=6, the quadrants can include upper right (I), upper left (II), center left (III), center left (IV), lower left (V) and lower left (VI). It should be noted that low resolution can be used to simulate a much higher resolution, especially when the touch surface is fairly small itself (hand sized). One of the advantages of the system 100 is that it can provide tactile feedback to more than one distinct point on surface 126 at about the same time. Surface 126 can be divided into an array of active areas each of which is influenced by a particular actuator. In this way, each haptic actuator can directly influence one area, however, effects from other actuators can combine to form a complex signal. For example, a finger placed at point X can receive a compound haptic response H(X) that can be a function of up to three haptic actuators associated with haptic regions n1, n2, and n3. In other words, the compound haptic response at point X can be expressed as equation (1):

$$H(X) = H(n1, n2, n3) \qquad \text{eq (1)},$$

where the relative contributions of each haptic node n1, n2, and n3 is related to the distance of X from each haptic node, respectively. For example, when at least two fingers are close together, one type signal can be generated. However when the at least two fingers move apart, then each of the at least two fingers can feel different haptic signals from different haptic actuators. Moreover, silent areas or quiescent areas (i.e., regions where a user would feel little or no appreciable sensation) can be created. These silent areas can be created when actuators generate signals that destructively interfere (signals are 180° out of phase with each other) within the region (also referred to as a null region).

Figure 3:
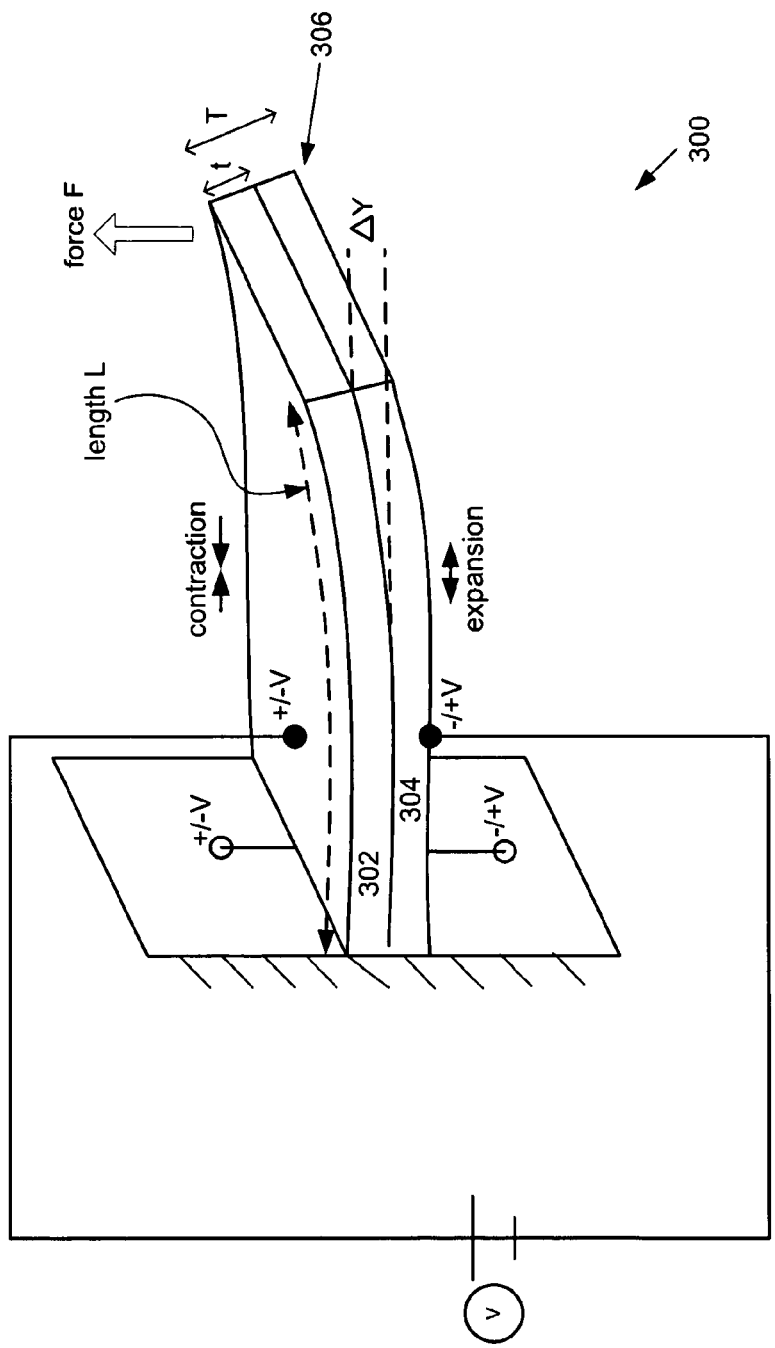
FIG. 3 shows a schematic diagram of a representative piezo-electric haptic assembly.

In the case where the haptic actuators are piezo-electric in nature, the vibro-tactile response is generated by the mechanical flexion of a member composed of a piezoelectric material. FIG. 3 schematically illustrates the structure and the principle of the operation of a representative multiple layer piezoelectric actuator assembly (also referred to as haptic device) 300 in accordance with the invention. The piezoelectric assembly 300 comprises an upper piezoelectric layer piezoelectric 302 and a lower piezoelectric layer 304 (it should be noted that there can be any number of layers). The piezoelectric assembly 300 can either expand or contract in accordance with the direction of an applied voltage V. For example, by applying, to the upper layer 302, a certain voltage of the direction opposite to the lower layer, the upper layer 302 contracts and the lower layer 304 expands at about the same time thereby causing the actuator 300 to bend upward (or downward) as a whole. Due to the inertial coupling of the actuator assembly 300 to the surface 126 when the inertial mass of the actuator is oscillated (by varying the applied voltage V), the inertial sensations are transmitted through member 306 to the surface 126. A foam layer (or other compliant layer) can be coupled between actuator assembly 300 and the surface 126 to provide compliance and allow the surface 126 to move inertially. It should be noted that haptic actuator 300 has a fast tactile bandwidth so that it can be used into tactile feedback device. Haptic actuator 300 can activate with very small latency so that it can be used in interactive tactile feedback application and consumes relatively low power and requires very low voltage. Advantageously, by using the multi-layered piezoelectric haptic actuator, it is possible to form the haptic device into small and thin chip.

Haptic actuator 300 generates force F directly proportional to voltage V applied to the haptic actuator 300 by the controller. Depending upon the polarity of voltage V, layers 302/304 either expand/contract or contract/expand resulting in a displacement ΔY of beam member 306. (It should be noted that displacement ΔY is much larger than the longitudinal contraction and expansion of each of layers 304/302.) More specifically, the displacement ΔY can be calculated using equation (2):

$$\Delta Y = k_1 \times d_{31} \times \left(\frac{L}{t}\right)^2 \times V \qquad \text{eq (2)}$$

where,
$k_1$: correction factor
$d_{31}$: piezoelectric constant value
L: length of the actuator
t: thickness of one layer of the actuator
V: voltage applied to the actuator The relationship between force F and voltage V can be quantified by equation (2):

$$F = k_2 \times d_{31} \times \frac{T}{W \times E \times L} \times V \qquad \text{eq (3)}$$

Figure 4:
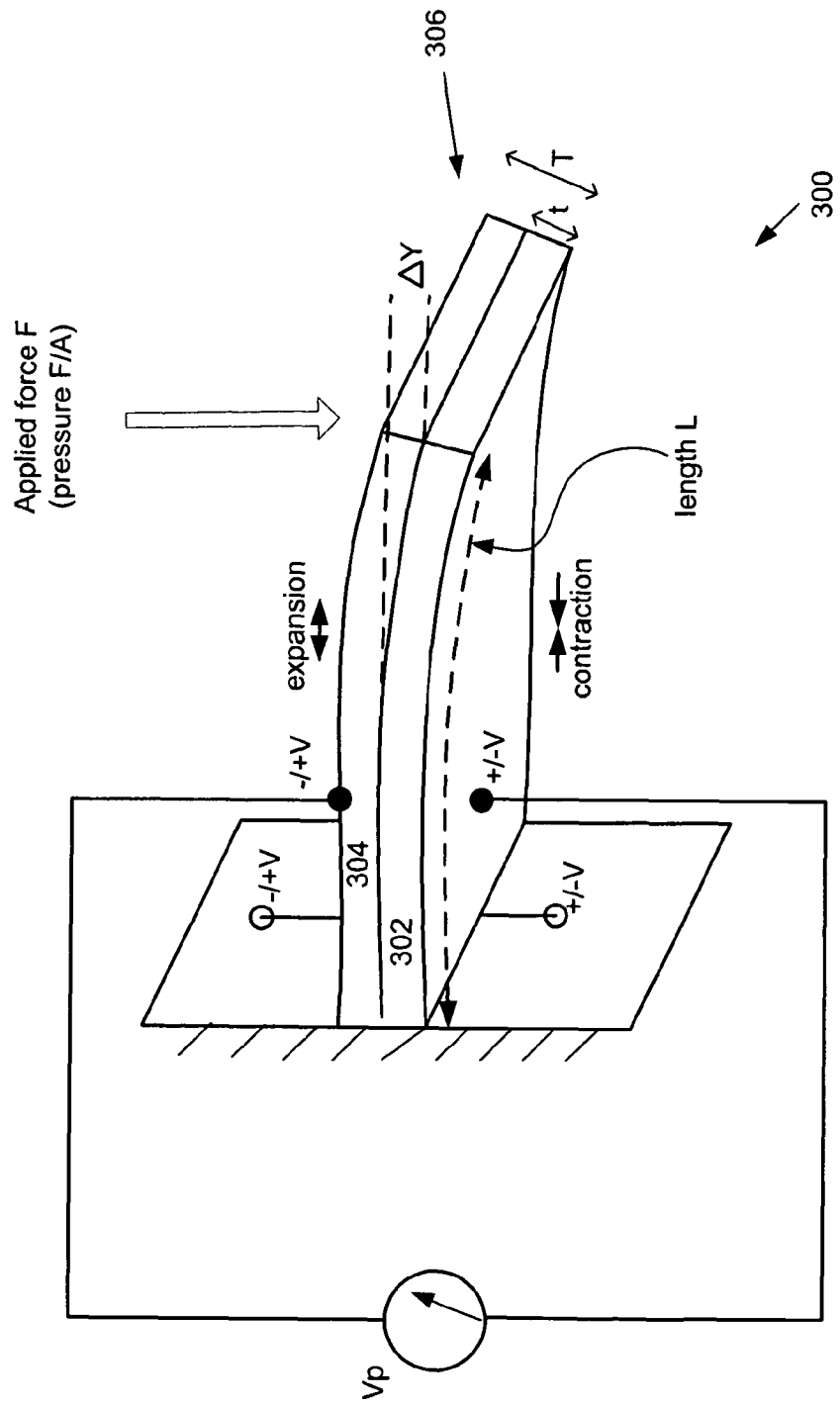
FIG. 4 shows a schematic diagram of the haptic assembly shown in FIG. 3 configured to act as a pressure sensor.

$k_2$: correction constant value
$d_{31}$: piezoelectric constant value
L: length of the actuator
T: thickness of the actuator
V: voltage applied to the actuator
E: longitudinal elastic coefficient As illustrated in FIG. 4, haptic device 300 can be used as a pressure sensor simply by sensing a voltage Vp generated by the displacement ΔY of member 306 caused by force F applied to the surface of surface 126. In this way, by monitoring voltage Vp, haptic device 300 can be configured to act as an integrated haptic actuator/pressure sensor arranged to change operational modes (passive to active, and vice versa). In the passive mode, the haptic device 300 can act as a pressure sensor by sensing if voltage Vp is generated by haptic device 300 when force F impinges on member 306 according to equation (3). When (and if) the sensed voltage Vp exceeds a threshold voltage Vpth, then the haptic device 300 can changes modes from passive mode to active mode. In active mode, a haptic profile is used to direct a controller circuit to provide voltage V to member 306 (as shown in FIG. 3) resulting in displacement ΔY creating the desired vibro-tactile effect on surface 126 in accordance with the selected haptic profile. In this way, haptic device 300 can considered an integrated pressure sensor/haptic feedback device that can be automatically switched back and forth between a pressure sensing device and a haptic feedback device.

Using the arrangements illustrated in FIGS. 3 and 4, pressure information can be linked with haptic feedback. For example, vibro-tactile sensation can be increased with increasing pressure, and vice versa. Accordingly, when a user exerts increased pressure (i.e., presses harder) on a surface, the amount of vibration felt by the user increases thereby informing the user that they are pressing harder. In another embodiment, a touch event can be characterized as either a light touch event or a hard touch event. In this situation, different vibro-tactic sensations can be produced based upon whether the touch event is light or hard (or something in between). For example, a light touch may correspond to a situation where a user uses light touch pressure to slide their finger across a surface whereas a hard press may be when a user pushes down on the surface with greater pressure, such as a button click. In one example, a hard press initiates a selection and that results in a click vibration being produced while a light touch performs no selection but does provide notification to the user that the user is in a location suitable for making a selection. In another embodiment, a click off vibration can be performed when the user begins lifting off of the touch screen i.e., the lift out effect can be produced as the user is in the process of lifting off of the screen instead of immediately thereafter. These different touch events can be distinguished by providing multiple threshold levels or sequence of thresholds that can be used. For example, a light touch can correspond to a first threshold level whereas a heavy touch can coincide with a second threshold level, and so on. Moreover, a lift off event can be distinguished when a sensed voltage indicates that a corresponding applied pressure is decreasing over time.

Figure 5:
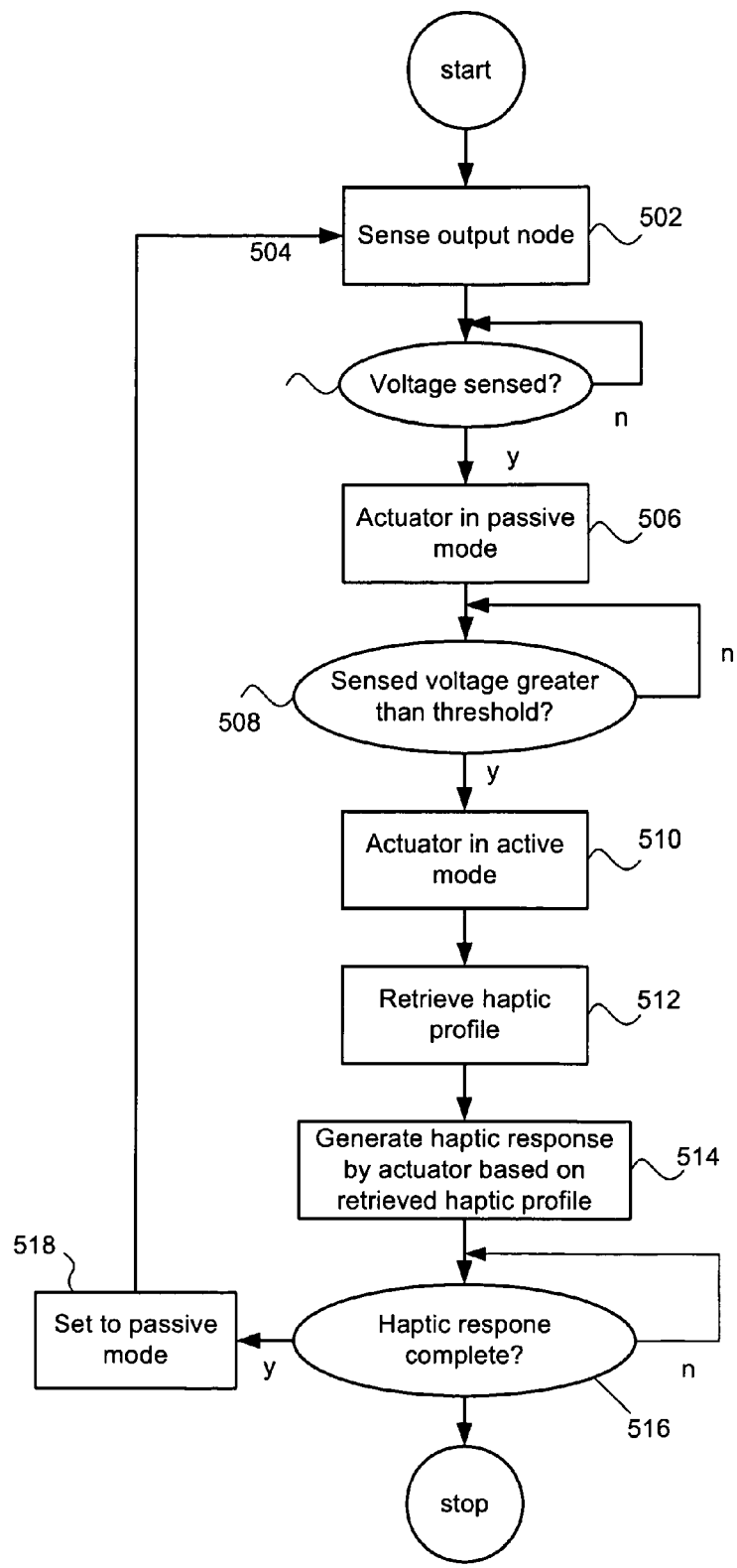
FIG. 5 shows a flowchart detailing a process in accordance with an embodiment of the invention.

FIG. 5 shows a flowchart detailing a process 500 for using a piezoelectric haptic actuator as both a pressure sensor and active haptic feedback device in accordance with an embodiment of the invention. Process 500 begins at 502 by sensing a node of haptic actuator 300. If, at 504, a voltage Vp is sensed, then the haptic actuator is in passive mode at 506. In passive mode voltage Vp is being generated by force F applied to the haptic actuator member 306 in accordance with equation (3) and shown in FIG. 4. At 508, if the sensed voltage is determined to be greater than a threshold voltage value, then at 510, the haptic actuator can be considered to be in active mode. By active mode, it can be understood to mean that the haptic actuator is now in a position to receive a voltage from a controlling circuit thereby causing haptic actuator to actively provide haptic feedback in the form of a vibro-tactile response created by haptic actuator member 306 (FIG. 3). Once it is determined that the haptic actuator is in active mode, then at 512, a haptic profile is retrieved from a haptic profile database. In the described embodiment, the haptic profile can be based upon any number of factors. For example, if the haptic actuator is associated with a button element of a graphical user interface, then the first threshold value can be indicative of an amount of pressure consistent with an intended pressing action by as user as opposed to a glancing touch not intended to be acted upon as a button press. At 514, once the appropriate haptic profile has been retrieved, a controlling circuit applies an appropriate control voltage to the haptic actuator consistent with the haptic profile. In some cases, the haptic profile can vary depending upon the amount of pressure applied. If, at 516, it has been determined that the haptic response is complete, then the haptic actuator is set to passive mode at 518 and control is passed back to 502.

Additional embodiments of the present invention are presented in accordance with FIGS. 6-13.

Figure 6:
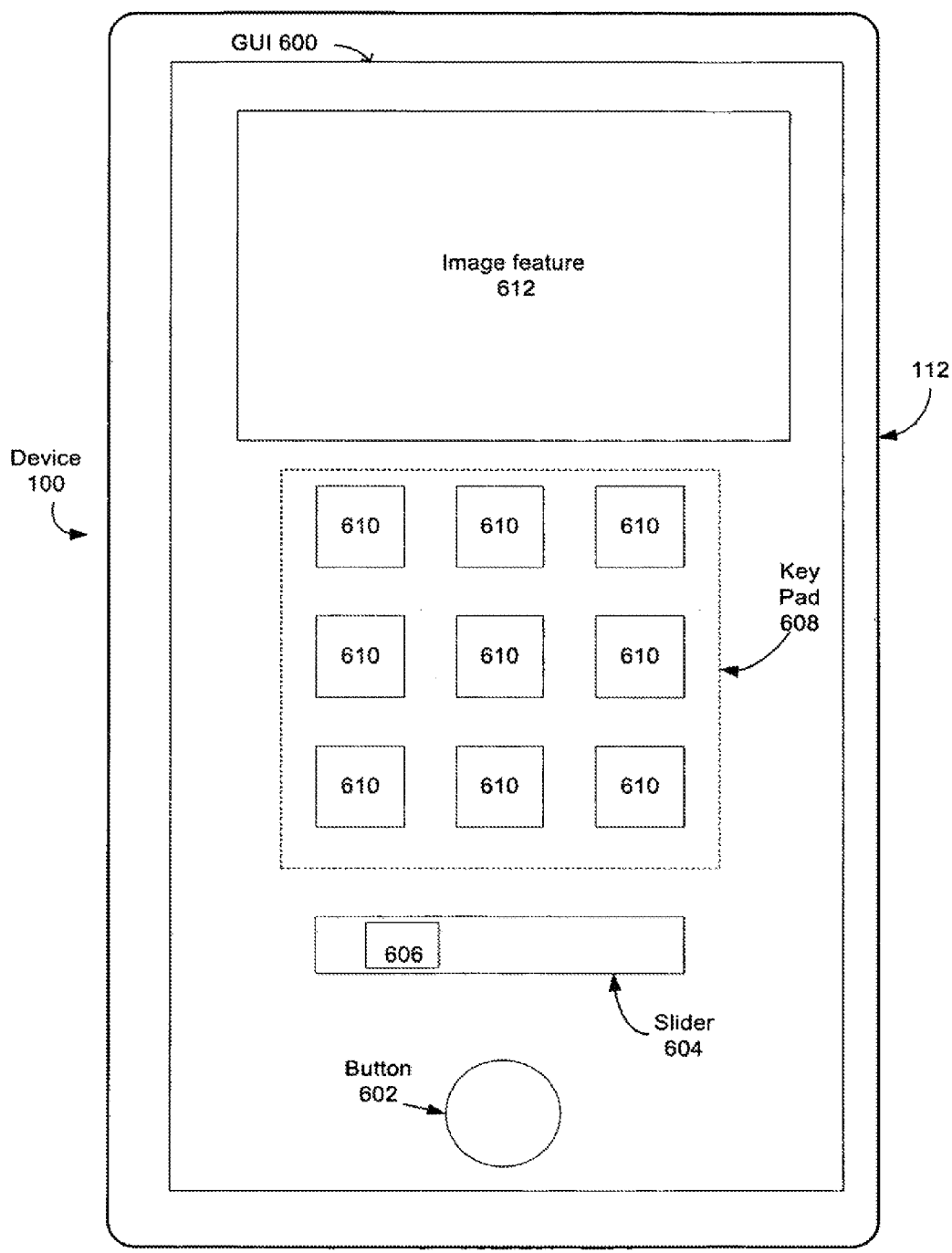
FIG. 6 shows display device displaying representative haptic active GUI elements in accordance with an embodiment of the invention.

FIG. 6 shows display device 112 displaying representative haptic active GUI elements in accordance with an embodiment of the invention. It should be noted that although only a small number of all possible GUI elements are discussed herewith, the following discussion can apply to any appropriate haptic active GUI element. Accordingly, in the context of device 100, processor 104 can direct display device 112 to display a number of haptic active GUI elements that taken together form representative GUI 600. Such haptic active GUI elements can include, for example, first type haptic active button icon 602, haptic active slider icon 604 having movable slider element 606, keypad 608 formed of a number of second type haptic active buttons 610. In the context of this discussion, the designations first and second type indicate that the haptic response associated with a particular GUI element. For example, a first type haptic response can be a high frequency vibration whereas a second type haptic response can palpable click. In should also be noted that button elements can be any appropriate shape or size.

FIG. 7 shows rectangular button element 702 and circular button element 704. In the described embodiments, button elements 702 and 704 can be arranged to exhibit haptic response $H_{button}(x)$ that enables a user to accurately identify target areas 706 and/or 708, respectively (also referred to as "sweet" spots). Target areas 706 and/or 708 can represent those portions of button elements 702 and 704 that are most sensitive to the application of pressure by a user and therefore would provide an optimum haptic feedback response. For example, $H_{button}(x)$ can be configured to provide haptic feedback that depends upon the location of a user's finger within a region defined by the button element. Accordingly, the button element can be divided into separate regions each having its own haptic response or a haptic response related to the haptic response of the other regions. In this way, the varying haptic responses can be arranged to "lead" a user to a particular target area 706 or 708. For example, button 702 (as well as button 704) can be divided into regions "target", region 1, and region 2. A user can experience a different haptic response in each of the regions such as $H_{target}$ in target region (a fast vibration, for example), $H_1$ in region 1 (a slower vibration than that presented in the target region), $H_2$ in region 2 and so on. The various haptic responses can be arranged to provide the user with the ability to "feel" their way to the target area without the need to actually view the display 112. In this way, the described embodiments allows a user to pinpoint the location of a target area of a button element (or any other GUI element so configured) in dark or low light conditions or in situations where the user cannot easily view display 112 by "feeling" their way to the particular target area. Accordingly, by following the "lead" provided by the varying haptic responses, a user can accurately identify target areas of particular buttons (or GUI elements) and once identified, can provide accurate tactile inputs to device 100 with the need to actually view display device 112. For example, by appropriately configuring haptic active button elements 610, a user can accurately enter data (such as a phone number) into device 100 by way of keypad 608 using the vibro-tactile feedback provided by haptic active button elements 610.

As shown in FIG. 8A, button elements 702 or 704 can have an associated haptic profile H(x). In one implementation, the haptic profile H(x) can include profiles that are related to each other in such a way as to lead a user to a particular location within the button (such as the target area). For example, as the user's finger moves across the portion of display 112 having keypad 608, the user can experience varied haptic responses that can depends upon the particular location of the user's finger on the surface 126. In this way, the user can be "lead" to the target area 706 by feeling his way along the surface 126. As shown in FIG. 8B, as the user's finger is moved across keypad 608, the user experiences haptic feedback based upon haptic profile H(x). In the example shown, in the region between button elements 602, the user's finger would be moving across a portion of surface 126 associated with a quiescent haptic response. By quiescent it is meant that the user would feel little or no haptic effects. However, once the user's finger intersects outer boundary 802 (that could be visible, or not) of button element 702, the user experiences haptic sensation $H_1$ corresponding to region 1. As the user's finger moves from region 1 to region 2, the user experiences haptic sensation $H_2$ corresponding to region 2, and so on until the user reaches target area 708. If the user's finger continues to move in such a way that it would be leaving target area 708 by re-entering region 2, for example, then the user would be made aware of this fact since the user would experience a change in the haptic sensation indicating that the user's finger is leaving target area 708.

FIG. 9A shows slider element 900 as a particular embodiment of slider element 604 shown in FIG. 6. Slider element 900 includes slider portion 902 that can be moved across surface 126 within the confines of slider element 900 by the action of a user's finger. As the user's finger is placed in contact with slide portion 902, the user can experience a haptic sensation consistent with haptic profile $H_{slider}(x)$ shown in FIG. 9B. In the described embodiment, as the user's finger (while still in contact with slide portion 902) moves slide portion 902 from left to right (or vice versa), then the user can experience vibro-tactile feedback based upon haptic profile $H_{slider}(x)$ where, for example, the haptic sensations monotonically increase from left to right and monotonically decrease from right to left, or vice versa. In some cases, $H_{slider}(x)$ can be a linear function of touch co-ordinate x (as shown in FIG. 9B) or can be non-linear depending of course on the application for which slider 900 is being used.

FIGS. 10A-10B illustrates yet another embodiment whereby a user can "feel" an edge of image feature 612 presented on display 112 shown in FIG. 6. In this embodiment, the user can "feel" edge E of feature 612 due to the fact that the haptic profile $H_{edge}(x)$ provides a haptic response in a region R in proximity to the edge E of feature 612. In some cases, the haptic response $H_{edge}(x)$ can be asymmetric (as shown in FIG. 10B) where a user approaching edge E from an interior portion of feature 612 will feel a gradually intensifying haptic response indicating to the user that edge E is being approached from the interior of feature 612. On the other hand, if the user's finger is approaching edge E of feature 612 from a region exterior to feature 612, then the haptic response $H_{edge}(x)$ will cause the user to experience a sharp step increase in haptic sensation at or near edge E itself. In the case where the haptic profile $H_{edge}(x)$ is symmetric, then the user will experience a haptic sensation of substantially equal no matter if edge E is approached from the interior or exterior regions of feature 612.

Figure 11:
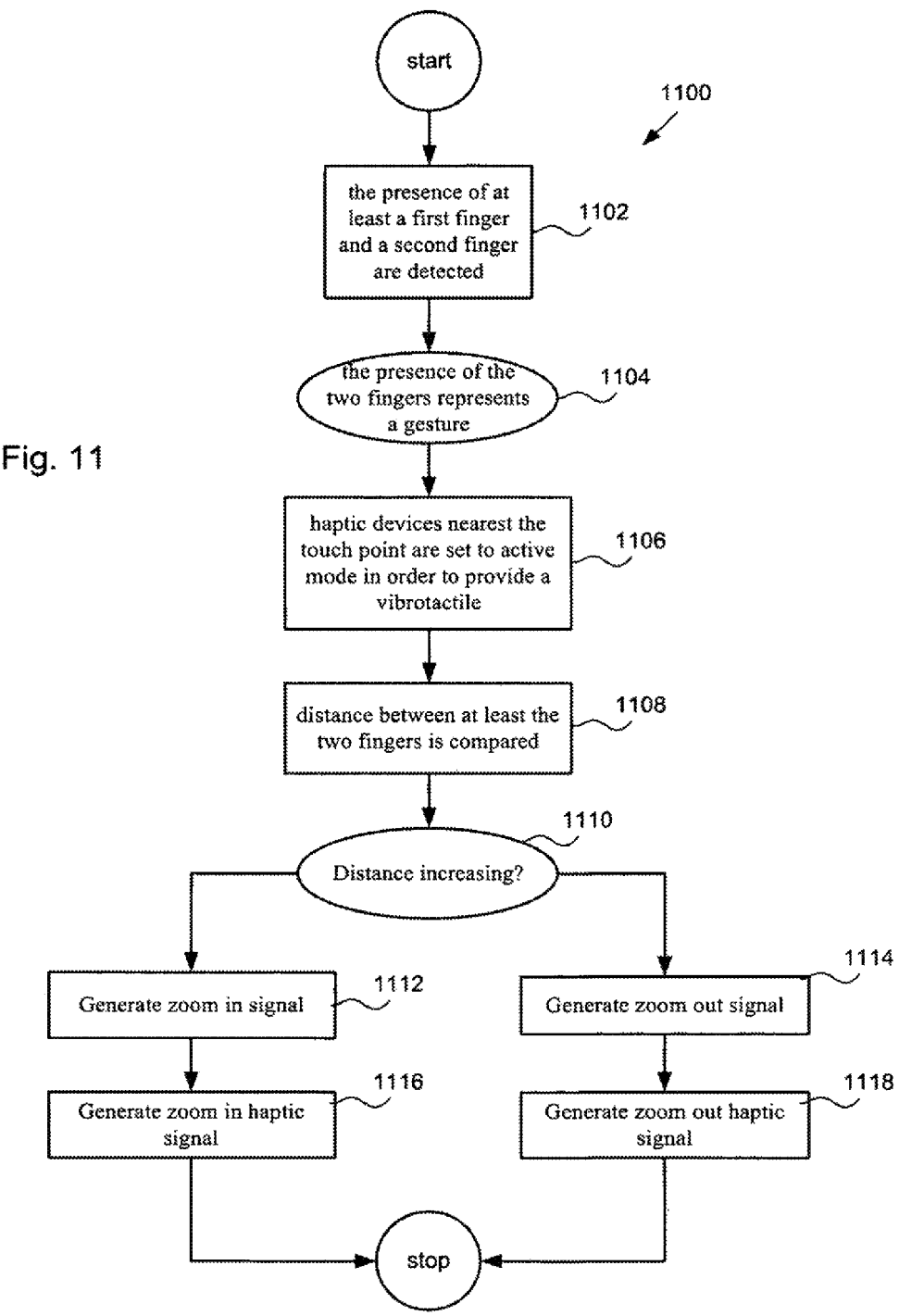
FIG. 11 is a diagram of a zoom gesture method 1100 in accordance with an embodiment of the invention.

FIG. 11 is a diagram of a zoom gesture method 1100 in accordance with an embodiment of the invention. The zoom gesture can be performed on multi-touch multi-haptic surface 126. It should be noted that initially, the haptic devices associated with the surface 126 can be in the passive state whereby the controller can monitor the condition of each of the haptic nodes by determining if there is voltage Vp is being generated by the haptic device indicative of pressure being applied in the vicinity of the haptic node. Accordingly, the zoom gesture method 1100 generally begins at block 1102 where the presence of at least a first finger and a second finger are detected on a touch sensitive surface of the surface 126 at about the same time. In the described embodiment, the nature of the multi-touch event can be determined based upon either the presence of at least two fingers indicating that the touch is gestural (i.e., multi-touch) rather than a tracking touch based on one finger and/or by the pressure asserted by the fingers on the surface 126. The pressure asserted by the fingers on the touch screen can be determined by monitoring the voltage Vp described above. If it is determined at block 1104 that the presence of the two fingers represents a gesture, then the haptic devices nearest the touch point are set to active mode in order to provide a vibro-tactile response at 1106 to each of the fingers during the gesture. In the described embodiment, the vibro-tactile response provided to each finger can have the same profile or different profiles. For example, if it the pressure applied by one finger is substantially greater than that applied by the other finger, then the vibro-tactile response for the two fingers can be different due to the varying pressure applied by each finger. For the most part, however, the haptic profiles will be correlated to assure that the user has a perception that the haptic effects are consonant with each other. Furthermore, it should be noted that in some cases, the presence of only two fingers indicates that the touch is a gestural touch. In other cases, any number of more than two fingers indicates that the touch is a gestural touch. In fact, the gestural touch may be configured to operate whether two, three, four or more fingers are touching, and even if the numbers change during the gesture, i.e., only need a minimum of two fingers at any time during the gesture.

Following block 1106, the zoom gesture method 1100 proceeds to block 1108 where the distance between at least the two fingers is compared. The distance may be from finger to finger or from each finger to some other reference point as for example the centroid. If the distance between the two fingers increases (spread apart) at 1110, a zoom-in signal is generated at 1112, otherwise a zoom out signal is generated at block 1114. The zoom-in signal, in turn, causes the haptic devices associated with the two fingers to provide a zoom-in haptic signal at 1116. Such a zoom in haptic signal can be, for example, faster (or slower) or more intense (or less intense) vibration as the distance between the two fingers increases. If the distance between two fingers decreases (close together), the zoom-out signal generated at block 1114 can cause the haptic devices associated with the two fingers to provide a zoom out haptic signal at 1118.

In most cases, the set down of the fingers will associate or lock the fingers to a particular GUI object being displayed. For example, the touch sensitive surface can be a touch screen, and the GUI object can be displayed on the touch screen. This typically occurs when at least one of the fingers is positioned over the GUI object. As a result, when the fingers are moved apart, the zoom-in signal can be used to increase the size of the embedded features in the GUI object and when the fingers are pinched together, the zoom-out signal can be used to decrease the size of embedded features in the object. The zooming typically occurs within a predefined boundary such as the periphery of the display, the periphery of a window, the edge of the GUI object, and/or the like. In some cases, a haptic effect can be provided giving the user a warning that the predefined boundary is being approached. The embedded features may be formed on a plurality of layers, each of which represents a different level of zoom. In most cases, the amount of zooming and the associated haptic effect varies according to the distance between the two objects. Furthermore, the zooming typically can occur substantially simultaneously with the motion of the objects. For instance, as the fingers spread apart or closes together, the object zooms in or zooms out at the same time and the corresponding haptic effect will change. Although this methodology is directed at zooming, it should be noted that it may also be used for enlarging or reducing. The zoom gesture method 1100 may be particularly useful in graphical programs such as publishing, photo, and drawing programs.

Figure 12A:
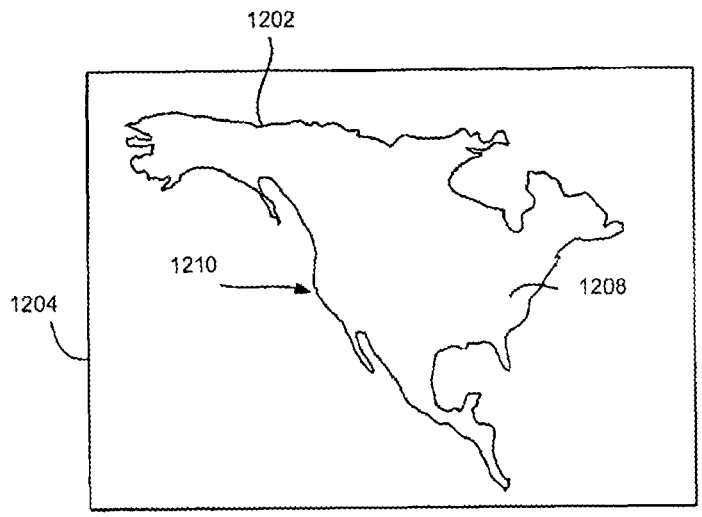
Figure 12B:
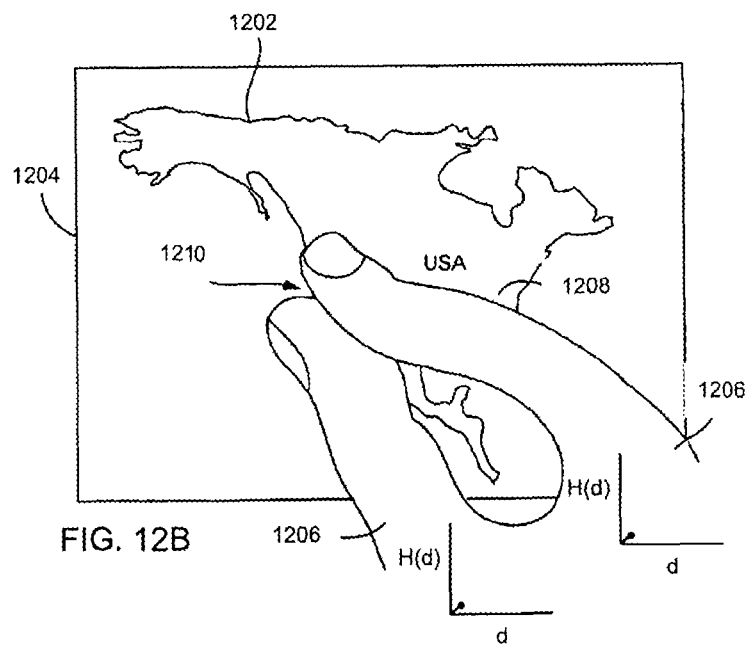
Figure 12E:
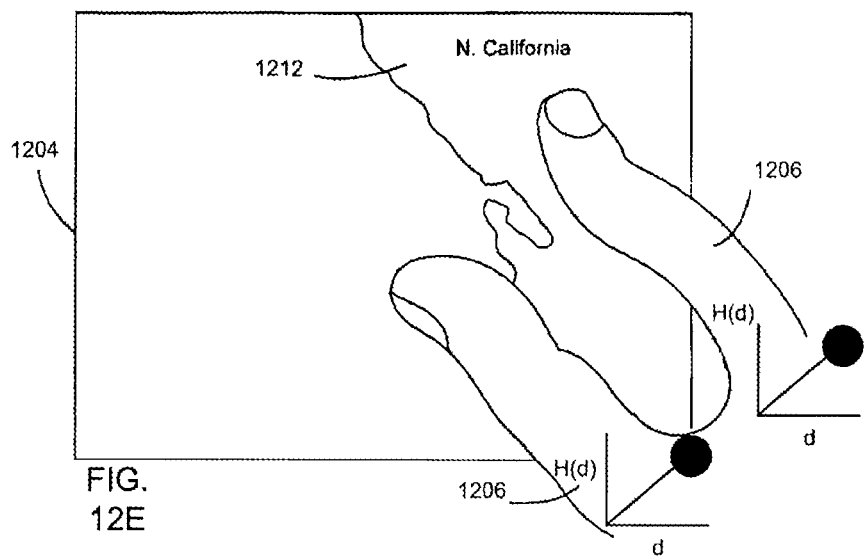
Figure 12F:
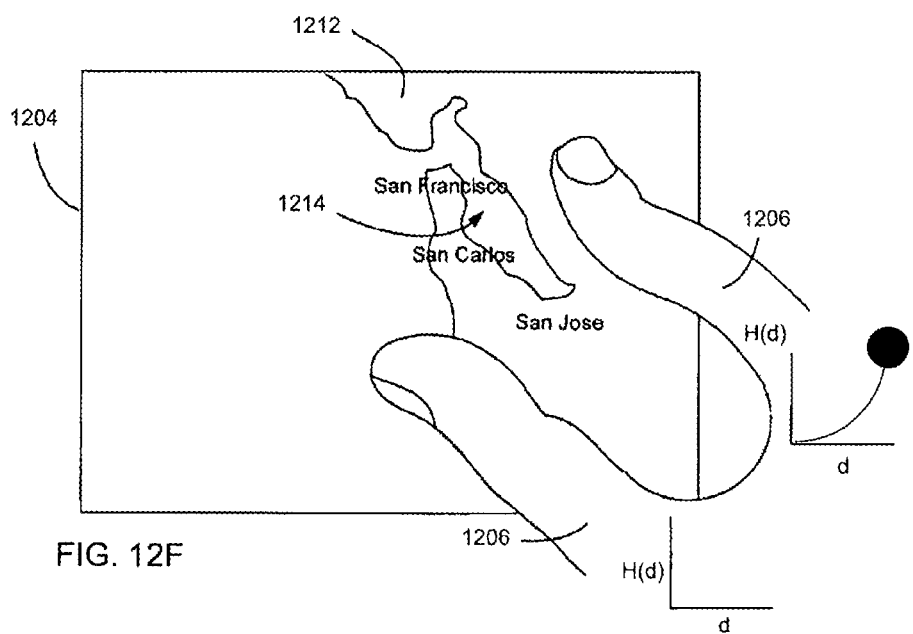

FIGS. 12A-12H illustrate a zooming sequence using the method described above. FIG. 12A illustrates a display presenting a GUT object 1202 in the form of a map of North America with embedded levels which can be zoomed. In some cases, as shown, the GUI object is positioned inside a window 1204 that forms a boundary of the GUI object 1202. Also shown are the haptic profiles for each of the fingers relating the distance d between the two fingers to the corresponding haptic response H(d) experienced at each finger. It should be noted that in this example, the magnitude of the haptic response H(d) at each finger is denoted by the size of the circle for each response. In this case, as the distance between the two fingers increases, the haptic effect H for each finger increases linearly with distance d. For example, when the two fingers are close together as in FIG. 12B, the haptic effect H is quite small as evidenced by the small size of the circle whereas as the two fingers move apart, the haptic effect H becomes progressively stronger at each finger. It should be noted that for the sake of simplicity only, the haptic profile H(d) is presumed linear for zooming in/out and non-linear for the rotation gesture shown in FIG. 12F. In the described embodiment, as the zoom factor increases, the haptic profile H(d) can change by, for example, the slope becoming more steep as the resolution of the underlying map increases as shown in FIG. 12G. FIG. 12B illustrates a user positioning their fingers 1206 over a region of North America 1202, particularly the United States 1208 and more particularly California 1210. In order to zoom in on California 1210, the user starts to spread their fingers 1206 apart as shown in FIG. 12C. As the fingers 1206 spread apart further (distance increases) the haptic effect felt by the two fingers changes as the map zooms in further on Northern California 1212, then to a particular region of Northern California 1214, then to the Bay area 1216, then to the peninsula 1218 (e.g., the area between San Francisco and San Jose Area), and then to the city of San Carlos 1220 located between San Francisco and San Jose as illustrated in FIGS. 12D-12H. In order to zoom out of San Carlos 380 and back to North America 368, the fingers 366 are closed back together following the sequence described above, but in reverse (along with the corresponding haptic effect).

Figure 13:
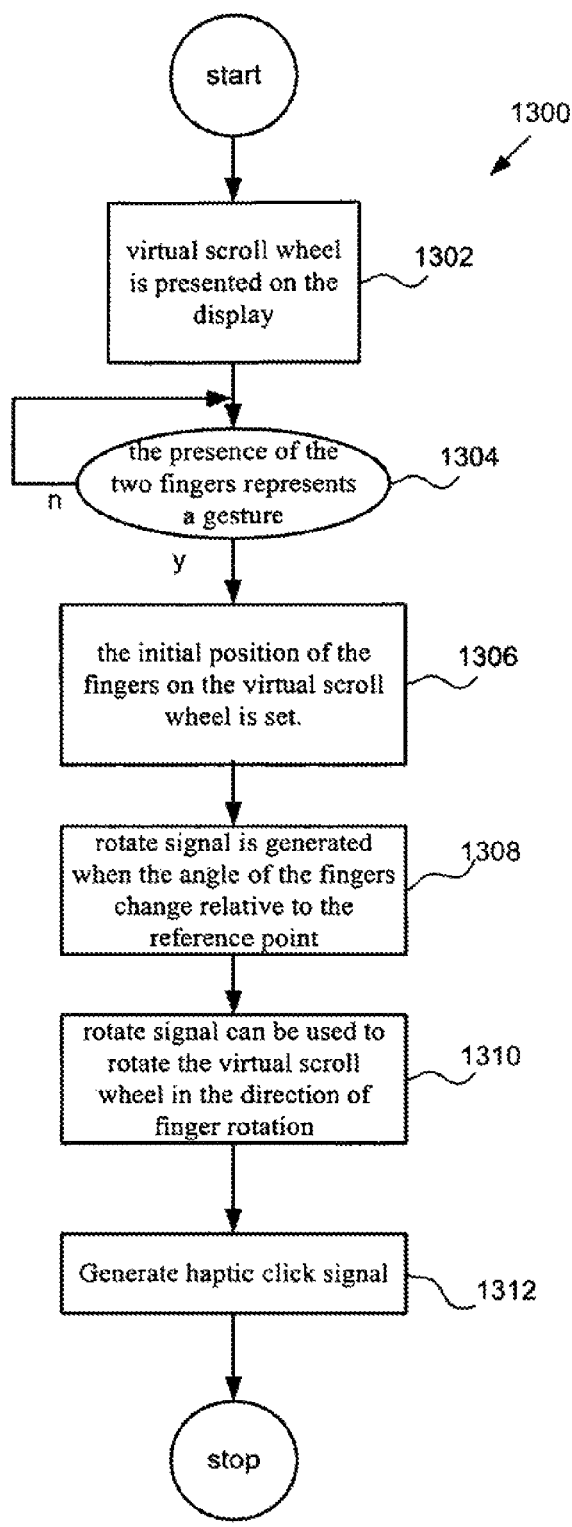
FIG. 13 is a diagram of a GUI operational method in accordance with one embodiment of the present invention.

FIG. 13 is a diagram of a GUI operational method 1300, in accordance with one embodiment of the present invention. The method generally begins at block 1302 where a virtual scroll wheel is presented on the display. In some cases, the virtual scroll wheel can include a virtual button at its center. The virtual scroll wheel is configured to implement scrolling as for example through a list and the button is configured to implement selections as for example items stored in the list. Following block 1302, the method proceeds to block 1304 where the presence of at least a first finger and more particularly, first and second fingers (to distinguish between tracking and gesturing) over the virtual scroll wheel is detected on a touch screen. The touch screen is positioned over or in front of the display. By way of example, the display can be an LCD and the touch screen can be a multi-touch touch screen. Following block 1304, the method proceeds to block 1306 where the initial position of the fingers on the virtual scroll wheel is set. By way of example, the angle of the fingers relative to a reference point can be determined (e.g., 12 o clock, 6 o clock, etc.).

Following block 1306, the method 1300 proceeds to block 1308 where a rotate signal is generated when the angle of the fingers change relative to the reference point. In most cases, the set down of the fingers associate, link or lock the fingers (or finger) to the virtual scroll wheel when the fingers are positioned over the virtual scroll wheel. As a result, when the fingers are rotated, the rotate signal can be used to rotate the virtual scroll wheel in the direction of finger rotation (e.g., clockwise, counterclockwise) at 1310 as well as provide an audible as well as palpable "click" at 1312 using at least two haptic actuators at 1310 to provide a physical sensation at the two fingers concurrently with the audible click simulating the "feel" of the click. In most cases, the amount of wheel rotation varies according to the amount of finger rotation, i.e., if the fingers move 5 degrees then so will the wheel. Furthermore, the rotation typically occurs substantially simultaneously with the motion of the fingers. For instance, as the fingers rotate, the scroll wheel rotates with the fingers at the same time.

The various aspects, embodiments, implementations or features of the invention can be used separately or in any combination. The invention is preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention. For example, although the invention has been primarily directed at touchscreens, it should be noted that in some cases touch pads can also be used in place of touchscreens. Other types of touch sensing devices can also be utilized. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An electronic device, comprising
a touch sensitive surface arranged to receive a user provided multi-touch event associated with at least a first location and a second location on the touch sensitive surface;
a multi-touch detection mechanism operatively coupled to the touch sensitive surface that detects the multi-touch event and generates a corresponding a multi-touch signal; and
a plurality of haptic feedback devices operatively coupled to the multi-touch detection mechanism and the touch sensitive surface;
wherein:
   the plurality of haptic devices provides at least a first haptic response at the first location, a second haptic response at the second location, and a null response at a location between the first location and the second location by generating signals that destructively interfere with each other in response to the multi-touch event; and
   the multi-touch detection mechanism determines a change to the multi-touch event and dynamically changes the first haptic response while the second haptic response remains static.

2. The electronic device of claim 1, wherein the plurality of haptic devices provides the dynamically changed first haptic response at a third location on the touch sensitive surface.

3. The electronic device of claim 1, wherein the first haptic response and the second haptic response are different.

4. The electronic device of claim 1, wherein the first haptic response and the second haptic response are discreet from each other.

5. The electronic device of claim 1, wherein at least one of the first haptic response or the second haptic response comprise a vibro-tactile response.

6. The electronic device of claim 1, wherein the plurality of haptic feedback devices include at least two different types of haptic feedback devices.

7. The electronic device of claim 1, wherein at least one of the first haptic response or the second haptic response is related to at least one amount of pressure applied to the touch sensitive surface.

8. The electronic device of claim 1, wherein the multi-touch event is associated with at least one of zooming, panning, scrolling, rotating, enlarging, gloating controls, zooming targets, paging, inertia, keyboarding, or wheeling.

9. The electronic device of claim 1, wherein the plurality of haptic devices are configured in at least one of a matrix or an array.

10. A method for processing a touch event at a touch sensitive surface, comprising:
   receiving a user provided multi-touch event associated with at least a first location and a second location on a touch sensitive surface;
   detecting the multi-touch event;
   generating a multi-touch signal corresponding to the multi-touch event;
   responding to the multi-touch signal by a plurality of haptic feedback devices providing at least a first haptic response at the first location, a second haptic response at the second location, and a null response at a location proximate to the first location and the second location in response to the multi-touch event;
   determining a change to the multi-touch event; and
   dynamically changing the first haptic response while the second haptic response remains static.

11. The method of claim 10, wherein the dynamically changed first haptic response is provided at a third location on the touch sensitive surface.

12. The method of claim 10, wherein the first haptic response and the second haptic response are different.

13. The method of claim 10, wherein the first haptic response and the second haptic response are discreet from each other.

14. The method of claim 10, wherein at least one of the first haptic response or the second haptic response comprise a vibro-tactile response.

15. The method of claim 10, wherein the plurality of haptic feedback devices include at least two different types of haptic feedback devices.

16. The method of claim 10, wherein at least one of the first haptic response or the second haptic response is related to at least one amount of pressure applied to the touch sensitive surface.

17. The method of claim 10, wherein the multi-touch event is associated with at least one of zooming, panning, scrolling, rotating, enlarging, gloating controls, zooming targets, paging, inertia, keyboarding, or wheeling.

18. The method of claim 10, wherein the plurality of haptic devices are configured in at least one of a matrix or an array.

19. A system for providing multi-touch haptic feedback, comprising:
   a touch sensitive surface arranged to receive a user provided multi-touch event associated with at least a first location and a second location on the touch sensitive surface;
   a multi-touch detection mechanism that detects the multi-touch event and generates a corresponding a multi-touch signal; and
   a plurality of haptic feedback devices;
      wherein in response to the multi-touch event the plurality of haptic devices provides at least:
      a first haptic response at the first location;
      a second haptic response at the second location; and
      a null response at a location between the first location and the second location by generating signals that destructively interfere with each other.

20. The system of claim 19, wherein the dynamically changed first haptic response is provided at a third location on the touch sensitive surface.

* * * * *